US010055801B2

(12) United States Patent
Smith et al.

(10) Patent No.: US 10,055,801 B2
(45) Date of Patent: Aug. 21, 2018

(54) SYSTEMS AND METHODS FOR GENERATING STRUCTURED DATA BASED ON SCANNED DOCUMENTS

(71) Applicant: Liberty Pipeline Services, LLC, The Woodlands, TX (US)

(72) Inventors: Charles Eric Smith, Dripping Springs, TX (US); Benjamin Dominguez-Benner, Cedar Park, TX (US)

(73) Assignee: LIBERTY PIPELINE SERVICES, LLC, The Woodlands, TX (US)

( * ) Notice: Subject to any disclaimer, the term of this patent is extended or adjusted under 35 U.S.C. 154(b) by 58 days.

(21) Appl. No.: 15/190,491

(22) Filed: Jun. 23, 2016

(65) Prior Publication Data

US 2017/0372439 A1    Dec. 28, 2017

(51) Int. Cl.
| | |
|---|---|
| *G06Q 50/08* | (2012.01) |
| *G06F 17/30* | (2006.01) |
| *H04L 29/08* | (2006.01) |
| *G06F 3/0484* | (2013.01) |
| *H04N 1/04* | (2006.01) |
| *H04N 1/21* | (2006.01) |
| *G06K 9/00* | (2006.01) |

(52) U.S. Cl.
CPC .......... *G06Q 50/08* (2013.01); *G06F 3/0484* (2013.01); *G06F 17/30011* (2013.01); *G06F 17/30312* (2013.01); *G06F 17/30424* (2013.01); *G06K 9/00469* (2013.01); *H04L 67/10* (2013.01); *H04N 1/0402* (2013.01); *H04N 1/2179* (2013.01); *G06K 2209/01* (2013.01)

(58) Field of Classification Search
CPC ............ G06F 3/0484; G06F 17/30312; G06F 17/30424; G06K 9/00469; H04L 67/10
USPC ....... 358/1.15, 1.9, 1.18, 505, 462; 382/176; 715/202, 235, 246, 268
See application file for complete search history.

(56) References Cited

U.S. PATENT DOCUMENTS

| | | | |
|---|---|---|---|
| 7,149,347 B1 * | 12/2006 | Wnek | G06K 9/00469 382/159 |
| 7,289,685 B1 | 10/2007 | Wolff et al. | |
| 8,793,756 B2 | 7/2014 | Mock et al. | |
| 2003/0140306 A1 | 7/2003 | Robinson | |
| 2005/0036681 A1 | 2/2005 | Lenoir | |
| 2005/0055246 A1 | 3/2005 | Simon | |
| 2005/0201639 A1 | 9/2005 | Wu | |

(Continued)

*Primary Examiner* — Jamares Q Washington
(74) *Attorney, Agent, or Firm* — Toler Law Group, PC

(57) ABSTRACT

A system and method for efficiently and securely converting physical documents, including handwritten reports, into structured data stored in databases is disclosed. The method includes extraction by a processor of electronic images or text from scanned physical documents and transmission of the extracted data by the processor to other devices for evaluation by data entry technicians. A candidate set of potential responses to a field may be provided to a data entry technician to enable the data entry technician to evaluate the extracted data. The candidate set may be generated based on responses extracted physical documents having the same author. Entries from different data fields of documents may be provided to different data entry technicians to reduce the amount of information provided to a data entry technician, thereby reducing security risks for documents containing confidential material.

22 Claims, 14 Drawing Sheets

(56) References Cited

U.S. PATENT DOCUMENTS

| | | |
|---|---|---|
| 2006/0007189 A1 | 1/2006 | Gaines, III et al. |
| 2007/0110314 A1* | 5/2007 | Houle ................ G06K 9/00154 |
| | | 382/186 |
| 2008/0155540 A1 | 6/2008 | Mock et al. |
| 2016/0217119 A1* | 7/2016 | Dakin .................. G06F 17/243 |

* cited by examiner

300

ENTRY EVALUATION

Current Entry:

⌐ 302

N

Please select which of the following most closely matches the current entry:

☐ Yes / Y  ⌐ 304

306
☑ No / N

☐ None of the Above

Please enter a new value:

307

⌐ 308

Likelihood of Match:  | 95% ▲▼ |

310  312
( Submit )  ( Clear )

ENTRY EVALUATION

Current Entry:

*First St* — 402

Please select which of the following most closely matches the current entry:

406 ☑ *First St.* — 404

☐ *North Blvd.*

☐ Lakeside Dr.

☐ None of the Above

Please enter a new value:

407 _____

Likelihood of Match: | 90% | ▲▼ | — 408

410 ( Submit )   412 ( Clear )

FIG. 4

INSPECTION REPORT

City: _Austin_   State: _TX_

Documentation matches parts used? _y_

Visible issues (e.g., rust, broken parts, missing parts)? _y_

Stress test passed? _y_

10-Point Safety Score:

1  2  3  4  5  6  7  8  (9)  10

Signature: _Bob I. Spector_

Date: _3/11/16_

---

INSPECTION REPORT

City: _Austin_ — 714
State: _TX_ — 716

Documentation matches parts used? _y_ — 718

Visible issues? _y_ — 720

Stress test passed? _y_ — 722

10-Point Safety Score: — 724

1  2  3  4  5  6  7  8  (9)  10

Signature: _Bob I. Spector_ — 726

Date: _3/11/16_ — 728

FIG. 7

A-1 Construction Inc.
INSPECTION REPORT

City: _Austin_   State: _TX_

Documentation matches parts used? _y_

Visible issues (e.g., rust, broken parts, missing parts)? _y_

Stress test passed? _y_

10-Point Safety Score:

1  2  3  4  5  6  7  8  (9)  10

Completed Inspection: ☒ Satisfactory  ☐ Unsatisfactory

Signature: _Bob I. Spector_   Date: _3/11/16_

---

A-1 Construction Inc.
INSPECTION REPORT

City: _Austin_   State: _TX_

Documentation matches parts used? _y_

Visible issues (e.g., rust, broken parts, missing parts)? _y_

Stress test passed? _y_

10-Point Safety Score:

1  2  3  4  5  6  7  8  (9)  10

Completed Inspection: ☒ Satisfactory  ☐ Unsatisfactory

Signature: _Bob I. Spector_   Date: _3/11/16_

1402 — Receive a digital image of a document at a first device

1404 — Perform a first text recognition operation on a first portion of the digital image 1406 — First portion includes machine-readable text?
- yes → (to 1410)
- no ↓

1408 — Generate an oriented image of the document by performing an orientation operation on the digital image 1410 — Identify one or more lines within a second portion of the oriented image 1412 — Angle(s) between lines and reference lines exceed threshold?
- no → (to 1416)
- yes ↓

1414 — Generate de-skewed image of the document by performing a de-skewing operation on the oriented image 1416 — Key word(s) located within third portion of the image?
- yes → (to 1420)
- no ↓

1418 — Generate modified image of the document by performing an alignment operation on the de-skewed image 1420 — Store the modified image in a database

SYSTEMS AND METHODS FOR GENERATING STRUCTURED DATA BASED ON SCANNED DOCUMENTS

FIELD OF THE DISCLOSURE

The present disclosure is generally related to generating structured data based on scanned documents.

BACKGROUND

Complex construction projects often are associated with a large volume of physical documents. For example, a construction project may be associated with many reports, forms, requisitions, task checklists, work orders, etc. Entering information from the physical documents into a computing system is a time-intensive and costly undertaking. For example, employing many data entry technicians to manually enter each document into a computing system is a significant cost for the construction project. Additionally, using data entry technicians to enter the information into the computing system may pose security risks. For example, the data entry technicians have access to information on each document, such as names of employees, locations associated with the construction project, and internal company data (such as identifiers, codes, or other sensitive information).

Instead of using data entry technicians to enter information from the documents into a computer system, the documents may be scanned using optical character recognition (OCR) technology. Scanning a document using OCR creates an electronic version of the document. However, the electronic version may be an image of the document. Because the individual data fields in the documents include handwritten entries, the information represented by the handwritten entries is not extracted and converted into structured data. To illustrate, scanning the documents does not generate data indicative of the individual data fields. Instead, scanning the documents creates an electronic image of the document as a whole. Because at least some of the responses in the individual data fields are handwritten responses, OCR may not convert the responses into structured data. To illustrate, the responses may not be converted into data that can be separately stored, categorized, and analyzed (e.g., searched using database queries). Creating non-structured electronic documents (e.g., via OCR) results in a large amount of stored data that requires human resources (e.g., to read each scanned document individually or to generate structured data from the documents). This conversion process is extremely time consuming and costly.

Additionally, the scanned images are difficult to integrate into a system that also receives electronic data. For example, a system may enable an inspector to fill out an inspection report using a mobile device (e.g., a mobile phone, a tablet device, a laptop computer, etc.) instead of filling out a paper inspection report. However, the information received by the system from the mobile device may be incompatible with the scanned documents. For example, the data received from the mobile device may be in a different format than the scanned document data. Additionally, the data from the mobile device may be processed and analyzed using data processing techniques that are not supported by the scanned document data (e.g., because the handwritten responses in the scanned documents have not been converted into structured data). Thus, for scanned documents that are not integrated with data produced by mobile devices, a system that scans in documents associated with a construction project is not able to be integrated with a system that supports data collection using mobile electronic devices. Additionally, because handwritten responses in the scanned documents are not converted to structured data, data analysis and report generation based on the scanned documents is limited. Thus, the system is unable to efficiently generate managerial reports and visual representations of the progress of the construction project. Without such reporting, an owner or primary contractor of a construction project may not be able to perform project management (including complying with government regulations or industry standards) without investing significant human resources to read and process the scanned documents.

SUMMARY

The present disclosure describes systems and methods for converting a large volume of physical documents, including handwritten notes and handwritten reports, into structured data to be stored in one or more databases with improved speed, efficiency, and security based on identification of the authors of the documents. Instead of merely scanning physical documents into a computing system, the computing system may extract images of handwritten responses to individual data fields from the scanned documents, and the computing system may distribute the extracted responses among data entry technicians for efficient conversion of the information to structured data. To illustrate, documents are scanned and identified by type. The system may be configured to rotate and/or align the scanned images of the documents in order to compare the scanned documents to templates in a template database. The template database may be prepopulated with a plurality of templates based on known document types, and as new document types (e.g., different reports, etc.) are created, an administrator may create and store new templates. A type of a scanned document may be determined based on a comparison of the scanned document to the templates.

Based on the document type, an author field is located and an image of the response (e.g., a signature) to the author field is extracted and evaluated to identify an author of each scanned document. Images of responses are extracted from one or more fields of each scanned document. The extracted set of responses and one or more expected responses may be provided to a data entry technician for evaluation. Additionally, if the author (e.g., a person who filled in entries within fields of a physical document) has an entry in a profile database, one or more candidate sets may be provided to the data entry technician, as further described herein. The one or more expected responses may include a limited set of responses determined based on the document type (e.g., is this field a checkbox field, a score field, etc.). A graphical user interface (GUI) may be displayed to the data entry technician, and the GUI may display the extracted responses and the one or more expected responses. The data entry technician may evaluate whether the extracted responses match the one or more expected responses, and evaluation data is generated based on user input from the data entry technicians (e.g., via a browser-based portal). The evaluation data may be received by the system and used to generate structured data (e.g., in a document profile) that can be separately stored, categorized, analyzed, and used to generate reports or visual displays.

The extracted responses may be provided to the data entry technicians based on the field type or the document type. Because responses to different fields (or portions thereof) may be provided to different data entry technicians, an amount of information from any given document that is made available to a particular data entry technician is reduced, thereby increasing security of confidential material. Evaluation data is generated based on user input from the data entry technicians (e.g., via a browser-based portal) and received by the system for use in generating structured data.

After one (or a few) documents by an author are processed and corresponding evaluation data is received, a profile associated with the author may be stored in the profile database. The profile may include one or more candidate sets associated with fields of documents. For example, a candidate set associated with a particular field of a particular document may include one or more images of handwritten (or otherwise completed) responses to the particular field of one or more previously analyzed documents corresponding to the author. When another scanned document associated with the author is identified, a candidate set and the extracted set of responses from the scanned document may be provided to a data entry technician to enable the data entry technician to efficiently evaluate the set of responses. For example, the data entry technician may be able to more efficiently match an extracted response to an entry in the candidate set than to one or more expected entries, because the extracted response and the entries of the candidate set may have common handwriting or other characteristics.

The author information may be used for other purposes in addition to generating candidate sets. For example, the structured data generated based on the scanned documents can be categorized by author. Thus, a user of the system may be able to search for information by author, which may be useful to allow a user to monitor all of the work done on the construction project by the particular author. As another example, the system may perform fraud detection using the author information. For example, the system may store one or more examples of each author's signature. When a new document by a particular author is identified, the signature may be compared to the one or more examples (e.g., using a multi-point analysis) to determine whether the signature matches the one or more examples within a tolerance. If the signature does not match (e.g., because someone else signed the document for the author), the system may initiate an appropriate action (e.g., a fraud alert).

Systems, methods, and apparatuses described herein enable conversion of a large volume of physical documents into structured data by identifying document types, extracting responses from fields in the documents, and providing the extracted fields to data entry technicians for evaluation and for data input. To improve the speed and accuracy of such evaluation, after one or more documents associated with an author are evaluated and processed, one or more candidate sets associated with the author are generated and are provided to the data entry technicians along with the extracted responses. The one or more candidate sets improve speed and accuracy of the evaluation because the one or more candidate sets include images of handwriting samples for use by the data entry technicians.

In a particular aspect, a method includes receiving, at a first device from a second device via a network interface, identification data responsive to transmission of first data from the first device to the second device. The first data is associated with an author field of a scanned document and the identification data indicates an author corresponding to an author field. For example, the first device (e.g., a server) may extract author field data (e.g., the first data) from a scanned document and transmit the author field data to the second device. The first device may receive the identification data from the second device based on evaluation of the author field data at the second device by a data entry technician. The method includes updating an indicator associated with a first entry in a database. The first entry corresponds to the scanned document. For example, the first device may update an author indicator of an entry in a document database based on the identification data. The entry may correspond to the scanned document from which the author field data is extracted. The method further includes transmitting a first data chunk from the first device to a third device via the network interface. The first data chunk includes a candidate set associated with the author and a first field type of a first field of the scanned document. Transmission of the first data chunk to the third device may enable evaluation of extracted field data using the candidate set by a data entry technician at the third device. Evaluation of the extracted field data may generate evaluation data, which is used by the first device to update entries in the document database, thereby generating structured data that may be used to perform data analysis, generate reports, or to initiate display of a graphical representation of the structured data.

In another particular aspect, a server includes a network interface configured to receive identification data from a second device responsive to transmission of first data to the second device. The first data is associated with an author field of a scanned document and the identification data indicates an author corresponding to the author field. For example, the network interface (of a server) may transmit author field data extracted from a scanned document to the second device. The network interface may receive the identification data from the second device based on evaluation of the author field data at the second device by a data entry technician. The server includes a processor and a memory coupled to the processor. The memory stores instructions that, when executed by the processor, cause the processor to update an indicator associated with a first entry in a database. The first entry corresponds to the scanned document. For example, the first processor may update an author indicator of an entry in a document database based on the identification data. The entry may correspond to the scanned document from which the author field data is extracted. The instructions further cause the processor to initiate transmission of a first data chunk to a third device via the network interface. The first data chunk includes a candidate set associated with the author and a first field type of a first field of the scanned document. For example, the processor may initiate transmission of a data chunk including extracted field data and the candidate set to the third device. A data entry technician at the third device may evaluate the extracted field data to generate evaluation data, which may be received by the network interface and used by the processor to update entries in the document database, thereby generating structured data.

In another particular aspect, a device includes a network interface configured to receive a data chunk from a first device. The data chunk includes a candidate set associated with a field of a scanned document and an author of the scanned document. The device includes an input/output (I/O) interface configured to receive input data in response to display of a graphical user interface (GUI) based on the candidate set. For example, the GUI may be displayed as part of a browser-based portal at a device of a data entry technician. The device further includes a processor and a memory coupled to the processor, the memory storing instructions that, when executed by the processor, cause the processor to initiate display of the GUI in response to receiving the data chunk via the network interface. The instructions further cause the processor to generate evaluation data based on the input data. The evaluation data indicates selection of an entry included in the candidate set. For example, the processor may initiate display of a GUI that includes an image of an extracted data from a field of a scanned document and a list of entries in a candidate set associated with the author and with the field from which the data is extracted. The data entry technician may select one of the entries in the candidate set that is a closest match to the extracted data, and the processor may generate the evaluation data based on the selection. The instructions further cause the processor to initiate transmission of the evaluation data to the first device via the network interface. The evaluation data may be used by the first device to generate structured data for use in performing data analysis, generating reports, and generating displays based on the structured data.

BRIEF DESCRIPTION OF THE DRAWINGS

FIG. 3 is a diagram depicting a first illustrative implementation of an entry evaluation graphical user interface (GUI);

FIG. 4 is a diagram depicting a second illustrative implementation of an entry evaluation GUI;

FIG. 7 is a diagram depicting a particular implementation of a template associated with a scanned document;

FIG. 8 is a diagram illustrating particular aspects of an orientation operation;

FIG. 9 is a diagram illustrating particular aspects of a de-skewing operation;

FIG. 10 is a diagram illustrating a particular implementation of an alignment operation;

FIG. 14 is a flowchart illustrating a particular implementation of a method of modifying a digital image of a document.

DETAILED DESCRIPTION

Figure 1:
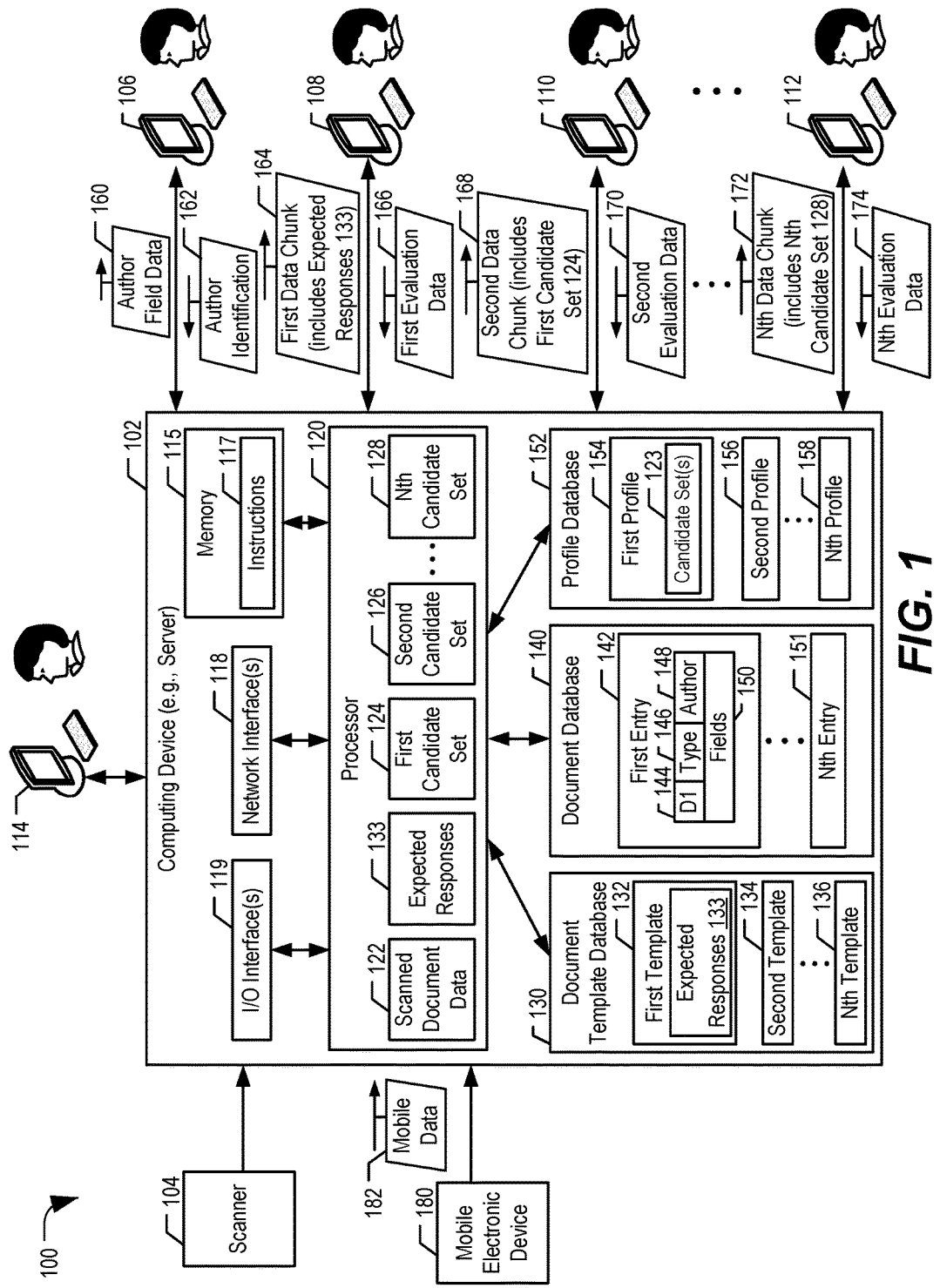
FIG. 1 is a diagram depicting a particular implementation of a system for analyzing documents and generating structured data based on information included in the documents.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Systems, devices, and methods that generate structured data based on a plurality of scanned documents are described herein. To illustrate, a construction project (e.g., a pipeline construction project) may be associated with many different documents, such as inspection reports, forms, requisitions, task checklists, work orders, etc. Entering the information from each document manually into a computer is costly and uses a significant amount of human resources. One way of reducing the cost of data entry is to scan the documents into a computer using one or more scanners. However, simply scanning the documents into an electronic form does not generate structured data that can be separately stored, categorized, and analyzed. For example, scanning documents may generate image files or other formats of electronic copies of documents. However, because the physical documents include handwritten responses to multiple different data fields, generating the electronic copies does not generate data based on the responses (e.g., names, dates, notes, etc.) to individual data fields within the documents. Because the responses to the individual data fields are not converted to structured data, information included in the responses is not able to be searched for using database queries and the information is not available in reports or visual displays. Thus, a system that simply scans physical documents does not efficiently generate managerial reports and visual representations of the progress of the construction project.

To reduce the monetary and resource costs to a construction project, systems and methods are disclosed that generate structured data based on a plurality of documents. To illustrate, a server (or other computing device) may be configured to receive document data from one or more scanners. The document data may correspond to a plurality of documents that include handwritten responses or notes. Each scanned document may be pre-processed by the server to improve the identification process. For example, the server may perform one or more alignment operations to "straighten" a skewed document. Additionally, the server may perform one or more rotation operations on a scanned document (as further described herein) to orient the scanned document to a target orientation.

The server may be configured to identify a type of each scanned document based on a set of templates in a template database. The template database may be prepopulated with a plurality of templates based on known document types. For example, an administrator may manually generate a template for each type of document associated with the construction project. Additionally or alternatively, the server may be configured to generate the templates (e.g., by modifying a default template). A template may identify characteristics of a document that are common to each instance of the document. For example, the template may include identifying information (such as a header or title) that identifies the document, location of text, location of particular fields where handwritten entries are expected, or other information. Additionally, the templates may include one or more expected responses to at least some of the fields.

When a document is scanned, the scanned document may be compared to the templates in the template database. The server may compare the scanned document to each template to generate similarity scores. The similarity scores may be compared to a threshold, and, if no similarity score exceeds a threshold, the server may provide the scanned document to another device (e.g., an administrator device) for generating a template. After generation of the template (by the administrator, the server, or both), the server stores the template in the template database.

If one or more similarity scores exceed the threshold, the scanned document may be identified as having a same document type as the template corresponding to the highest similarity score. In response to identifying the document type of the scanned document, the server may extract a response to an author field of the scanned document by extracting an image of the handwritten response from the scanned document at a location indicated by the template. For example, the template may indicate a location in the document that contains an author field, and the server may extract an image of a response (e.g., a signature) from the location within the scanned document. The extracted response may be transmitted as author field data to a device of a data entry technician for identification. The device may display a graphical user interface (GUI) that displays examples of other extracted author field data (e.g., images of handwriting samples of authors' names extracted from other documents) for the data entry technician to compare to the author field data. Additionally or alternatively, the GUI may display one or more expected values (e.g., a filled in checkbox, a circled score, etc.). The data entry technician may select the author name that most closely matches the author field data using a user input device, such as a keyboard, a keypad, a touchscreen, a voice input device, etc. In response to the user input from the data entry technician, the device (e.g., the data entry technician's device) may generate identification data and transmit the identification data to the server. The identification data may identify the author of the scanned document.

The server may generate an entry in a document database that corresponds to the scanned document. The entry may indicate the type of document (e.g., based on the template) and the author of the document (e.g., based on the identification data). This process may be repeated for a large number of scanned documents. The entries in the document database (once completed) represent structured data that may be used to enable database queries, to generate reports, and to generate displays to a user.

After the server identifies the type and author of each scanned document, the server may extract responses to fields of the scanned documents, and the server may provide the extracted responses to devices of data entry technicians as data chunks. To illustrate, the server may extract responses to the first field (e.g., an address field, as a non-limiting example) from each scanned document having a particular type (e.g., an inspection report). If an author of a scanned document that a response is extracted from does not have a corresponding entry in a profile database, the server may retrieve one or more expected values from the corresponding template. For example, if the construction project is a new project or a project that is beginning a process of scanning in documents, the profile database may be empty (or store only a few entries, depending on whether any documents have been processed). As another example, the author may be a new employee or worker to the project who is not associated with any previously processed documents and thus does not have a corresponding profile in the profile database. The server may transmit the extracted responses and the one or more expected responses to a device associated with a first data entry technician as a "data chunk." The device may be configured to log in to a browser-based portal (via a network or the Internet) to access data, such as the data chunk, from the server and to provide data, such as evaluation data, to the server. The first data entry technician may evaluate the extracted responses, as further described herein, and the evaluated responses may be used to populate one or more candidate sets for the author.

If the author (e.g., "Bob") has an entry in the profile database, the server may retrieve a candidate set of previous entries based on the author. As used herein, a "candidate set" refers to a candidate set of entries (e.g., entries from fields of other scanned documents). A candidate set may include one or more entries for a particular field corresponding to an author. For example, a first candidate set may include images of multiple handwritten responses by "Bob" to an address field in an inspection report, or images of checkboxes filled in by "Bob," or images of other responses to fields in the documents. A profile database may store a plurality of profiles corresponding to a plurality of authors, each profile including one or more candidate sets associated with the author and with one or more fields of one or more documents. For example, a first profile may be associated with "Bob" and may include a first candidate set associated with a first field of an inspection report and a second candidate set associated with a second field of the inspection report or a field of a different document. As particular examples, the first candidate set may be associated with an address field and may include one or more images of handwritten addresses written by the author on other documents, and the second candidate set may be associated with a date field and may include one or more images of handwritten dates written by the author.

To illustrate, the profile database may originally be empty (e.g., contain a null set). When a scanned document is identified and an author is determined, the server may generate a data chunk that includes extracted responses and one or more expected responses from the corresponding document template. After the data entry technician evaluates the extracted responses using the one or more expected responses, the server receives evaluation data that is used to update entries in the document database. The server may also generate a profile for the author and use the extracted responses to generate a candidate set for the corresponding fields. For example, the images of the extracted responses for a field may be included in the candidate set for the field, and the entries in the candidate set may be associated with structured data that is generated based on the evaluation data. The candidate set may also include "historical data," such as responses to the field from documents associated with the author that were previously analyzed, or previous known responses that have been entered into the system by an administrator. As more scanned documents associated with an author are processed, the candidate set grows to include additional entries. Additionally or alternatively, some author profiles may be prepopulated with candidate sets that are prepared by an administrator.

In response to determining that the author corresponds to a profile stored in the profile database, the server may access the profile to retrieve a candidate set corresponding to the fields to be evaluated in order to generate the data chunk. For example, to generate a data chunk that includes extracted responses associated with an address field of an inspection report completed by "Bob," the server may access a profile corresponding to "Bob" to retrieve a candidate set associated with the address field of inspection reports. In this example, the candidate set may include images of one or more handwritten addresses written by "Bob" as responses to address fields of other inspection reports.

The data chunk may be transmitted to a device of a data entry technician, and the data entry technician may evaluate the data chunk by selecting which entry from the expected responses or from the candidate set most closely matches each extracted response. The server may receive evaluation data that indicates the evaluation of each extracted response. In this manner, structured data (e.g., data indicative of the handwritten responses) is generated. The data is referred to as structured data because the data is in a form that can be stored, categorized, analyzed, and processed separately, as compared to scanned images of documents in which data corresponding to handwritten answers is not separately retrievable for categorization or analysis.

To increase efficiency and to improve security, data chunks may be provided to different data entry technicians based on different fields. For example, extracted responses to different fields are sent to different data entry technicians, and extracted responses to the same fields may be sent to the same data entry technicians. In this manner, the server provides data chunks such that each data entry technician is exposed to a part, and not an entirety, of any given document. By routing entries based on field types, efficiency is improved because each data entry technician becomes familiar with a reduced number (e.g., one or a small number) of expected responses or candidate sets. Additionally, by providing only extracted responses (instead of an entire scanned document), security is improved because no data entry technician has access to enough information to enable understanding of the construction project or of a full document or form. Such security may be required by laws or industry regulations, or may be in accordance with industry standards.

After receiving the evaluation data generated by the data entry technicians, the server populates the rest of the entries in the document database. For example, data representing responses to each of the fields in the scanned documents is stored in a corresponding field of an entry in the document database. Additionally, the server may update one or more candidate sets based on the evaluation data. For example, if the evaluation data indicates that an extracted response does not match any entry in the corresponding candidate set, the server may initiate an update process for the corresponding profile (to be performed by the server or by an administrator). The server may additionally process or perform analysis on the structured data using the author data. For example, the server may be configured to perform a database search of the document database based on author. As a particular example, if an inspector is identified as the author of an inspection report for a location that is later associated with an issue (e.g., a safety issue, a missed deadline, etc.), a user may cause the server to search for other inspections performed by the author as part of a safety analysis. The author data may also be used to perform fraud detection. For example, the server may store one or more images of each authors' signature. When a document is identified as being associated with an author, the server may compare (e.g., using a multi-point comparison, an electronic handwriting comparison, or some other type of comparison) the signature from the document to the one or more images corresponding to the author. If a similarity between the signature and the one or more images fails to exceed a threshold, the server may initiate an appropriate operation. To illustrate, if a different person signs an author's name on an inspection report, the server may determine that the signature does not match the one or more images of the author's signature and may send an alert to an administrator.

In some implementations, the server is configured to convert legacy data formats to entries in the document database. For example, the server may receive legacy data from another device, and the server may convert the legacy data into one or more entries in the document database. Additionally or alternatively, the server may extract information from the legacy data and provide the information to the data entry technicians in order to receive evaluation data (based on the legacy data) that can be used to add or update entries in the document database. In this manner, the server may be able to combine multiple formats of data (including legacy data) into a single format that is used as structured data for data analysis, report generation, and display generation.

After the evaluation data is received and the entries in the document database are updated, each entry in the document database includes indicates a type of the document, an author of the document, and data indicating the responses to one or more fields of the document. The data in the document database is structured data that may be processed and analyzed. For example, data processing algorithms or other techniques may be performed to generate a valuation of the construction project, a status report of the construction project, or other information.

In a particular implementation, the server may be configured to initiate display of a GUI that enables a time-varying, high-level overview of the construction project. The GUI may have one or more selectable indicators that enable a user to retrieve information associated with a particular time period of the construction project or a particular location of the construction project. For example, a user may select a particular location of the construction project on a map and a particular time period on a timeline, and the GUI may provide access to the scanned documents, images, video, analyzed data, or other information associated with the selected location and time period. Additionally or alternatively, the GUI may enable generation of one or more reports based on the data included in the scanned documents. Providing this information in an easy-to-understand visual format (or report) may reduce the amount of time that an owner or primary contractor of the construction project invests in reviewing the physical documents to determine a status of the construction project. Additionally, the information provided by the GUI (or report) may be information that is required by an industry standard, laws, or regulations. Thus, the GUI (or report) may enable the owner or primary contractor to comply with applicable laws, regulations, and/or industry standards in a quick and efficient manner.

Referring to FIG. 1, an implementation of a system 100 that analyzes documents and generates structured data based on information included in the documents is shown. The system 100 includes a computing device 102 (e.g., a first device, such as a server), a scanner 104, a second device 106 (e.g., a computer workstation, a personal computer, a tablet computer, or a mobile computing device), a third device 108 (e.g., a computer workstation, a personal computer, a tablet computer, or a mobile computing device), a fourth device 110 (e.g., a computer workstation, a personal computer, a tablet computer, or a mobile computing device), an Nth device 112 (e.g., a computer workstation, a personal computer, a tablet computer, or a mobile computing device), and an administrator device 114 (e.g., a computer workstation, a personal computer, a tablet computer, or a mobile computing device). The scanner 104 may be configured to scan a document and to provide scanned document data 122 to the computing device 102.

The computing device 102 may include a processor 120, a memory 115, a network interface 118, an input/output (I/O) interface 119, a document template database 130, a document database 140, and a profile database 152. The memory 115 stores instructions 117 that may be executed by the processor 120 to cause the processor 120 to perform the operations described herein. In a particular implementation, the memory 115 may include or correspond to a computer-readable storage device (e.g., a non-transitory computer readable medium) that stores the instructions 117. The computing device 102 may be coupled to the scanner 104 via the I/O interface 119 and coupled to the devices 106-112 and the administrator device 114 via the network interface 118. Although the computing device 102 is illustrated as including the document template database 130, the document database 140, and the profile database 152, in other implementations, the document template database 130, the document database 140, the profile database 152, or a combination thereof, may be external to the computing device 102. For example, one or more of the document template database 130, the document database 140, or the profile database 152 may be an external database that is accessible to the computing device via a network and the network interface 118.

The document template database 130 may include one or more templates that correspond to physical documents, such as a first template 132, a second template 134, and an Nth template 136. Each of the one or more templates may correspond to a particular physical document, such as an inspection report, and may indicate locations of one or more data fields present within the physical document. The template may include identifying information (such as a header or title) that identifies the document, location of text, location of particular fields where handwritten entries are expected, or other information. For example, a physical document that is an "inspection report" may have text fields for written entry of an address of the inspection location, the author of the inspection report, the date of the inspection, a score for the inspection, yes or no fields, notes for the inspection, or other information. Each of the templates may include sets of expected responses. For example, the first template 132 may include a set of expected responses 133. To illustrate, with respect to the "inspection report," expected responses to the author field may include names of inspectors associated with a construction project, expected responses to the score field may include permissible scores (e.g., 100, 90, 80, and other numbers or "safe," "needs improvement," "safety hazard," etc.), and expected responses to the yes or no field may include "Yes," "Y," "No," and "N." An example of a template is described with reference to FIG. 7.

Each of the physical documents may be associated with a construction project. In a particular implementation, the construction project is a pipeline construction project. One or more industry standards or regulations may require that a large volume of physical documents be maintained by an owner or a primary contractor of the construction project. As described herein, the system 100 may enable electronic storage of the information within the physical documents and may enable generation of structured data based on the information. Storing the documents electronically is less expensive and more convenient than storing the physical documents. Additionally, the structured data may enable the computing device 102 to support database queries, report generation, and visual displays based on the information in the physical documents that would otherwise not be available if the physical documents are simply scanned into a computer using a scanner. For example, handwritten responses to fields may be converted into structured data that can be categorized and searched, thereby improving the ability of the computing device 102 to perform data analysis on documents related to the construction project.

The document database 140 may store entries (e.g., data) indicating one or more scanned documents received at the computing device 102. The entries may include a first entry 142 and an Nth entry 151. Each entry, such as the illustrative first entry 142, may include an identifier 144, a document type indicator 146, an author indicator 148, one or more fields 150, or a combination thereof. The identifier 144 may identify the entry, the document type indicator 146 may indicate a document type of the entry (e.g., which template the document corresponds to, for example an inspection report, an order form, etc.). The author indicator 148 indicates an author of the document (e.g., the person who signed the physical document and filled in the responses). The one or more fields 150 include data representing responses extracted from the scanned document. The fields 144-150 of the entries of the document database 140 may be generated during processing of the one or more scanned documents, as further described herein.

During processing of the scanned documents, profiles corresponding to authors of the scanned documents may be generated. As the profiles are generated, the profiles may be stored in the profile database 152 (e.g., an author profile database). For example, after generation of N profiles, the profile database 152 may store a first profile 154 associated with a first author, a second profile 156 associated with a second author, and an Nth profile 158 associated with an nth author. The profiles may be generated during processing of a plurality of scanned documents (e.g., the profile database 152 may be empty or store a null set prior to processing of any scanned documents), as further described herein. Each profile may include one or more candidate sets corresponding to fields within documents, the candidate sets indicating entries in the corresponding field. For example, the first profile 154 may include candidate set(s) 123. The candidate set(s) 123 may include a candidate set for responses to a first field (e.g., an address field) of an inspection report, a second field (e.g., a data field) of the inspection report, a third field (e.g., a score field) of the inspection report, other fields, or a combination thereof. In some implementations, the candidate sets may include similar responses from fields of different documents. As an example, the candidate set for the address field may also include responses from address fields of other documents that have been filled out by the author, such as status reports or order forms. Each candidate set may include one or more images (e.g., extracted portions of scanned documents) corresponding to handwritten responses to the data fields of multiple instances of a document that are associated with the author.

In a particular implementation, at least some of the entries in the document template database 130, the profile database 152, or both, are generated prior to extraction and processing of all the data in the one or more scanned documents. For example, one or more administrators may generate at least some of the entries in the document template database 130, the profile database 152, or both as part of an initial process. To illustrate, one or more administrators (using the administrator device 114) may generate templates for each known document type associated with the construction project. As new types of documents are processed, an administrator may add new templates to the document template database 130. Alternatively, the computing device 102 may generate the templates (e.g., by modifying a default template) as new types of scanned documents are processed. In some implementations, an administrator may use a subset of the scanned documents to generate one or more profiles (and one or more candidate sets) associated with a few authors for storage in the profile database 152. In other implementations, the profiles may be generated as scanned documents are processed and as extracted responses are evaluated, as further described herein. Thus, in some implementations, the profile database 152 may initially be empty (e.g., may store a null set) prior to processing of any scanned documents associated with the construction project.

In response to the computing device 102 receiving the scanned document data 122, the computing device 102 may perform one or more orientation (e.g., rotation) operations, one or more de-skew operations, one or more alignment operations, or a combination thereof, on each scanned document associated with the scanned document data 122. For example, a scanned document may have an orientation that does not match the orientation of the templates in the document template database 130. The computing device 102 may be configured to determine that the scanned document has a different orientation in response to determining that a text recognition operation performed on a designated text region does not identify machine-readable text. In response to determining that no machine-readable text is identified, the computing device 102 may perform an orientation operation to orient the scanned document to a target orientation. For example, if the scanned document is upside down, the computing device 102 may perform a rotation operation to rotate the scanned document by approximately 180°), as further described with reference to FIG. 8.

Subsequent to determining whether to perform the orientation operation on the scanned document, the computing device 102 may determine whether to perform a de-skew operation on the scanned document. For example, the computing device 102 may determine a difference between lines in a text region and horizontal reference lines, and the computing device 102 may perform a de-skew operation on the scanned document based on the difference, as further described with reference to FIG. 9. Subsequent to determining whether to perform the de-skew operation, the computing device 102 may be configured to determine whether the scanned document is improperly aligned. In response to a determination that the scanned document is improperly aligned, the computing device 102 may perform an alignment operation to cause the scanned document to be aligned to a target alignment corresponding to an alignment of a document template, as further described with reference to FIG. 10.

After performance of any orientation operations, de-skew operations, and alignment operations, the computing device 102 may compare each scanned document to the templates in the document template database 130 to generate similarity scores. If no similarity score exceeds a threshold, the computing device 102 may provide the scanned document to the administrator device 114 for generation of a template by an administrator, or the computing device 102 may return an error condition.

In an illustrative implementation, the computing device 102 may receive scanned document data 122 from the scanner 104 via the I/O interface 119. The scanned document data 122 may correspond to the data from a scanned physical document (e.g., a requisition form, an inspection report, a task summary, etc.). The computing device 102 may determine whether to perform one or more rotation operations or alignment operations to achieve a target orientation of the scanned document. After the computing device 102 determines that an orientation of the scanned document matches a target orientation, the computing device 102 may process a portion of the scanned document data 122 to identify a document type (e.g., a requisition form, an inspection report, a task summary, etc.) corresponding to the scanned document data 122 (e.g., a type of the scanned document). For example, the computing device 102 may compare one or more extracted portions of the scanned document to identifying information associated with each of the templates 132-136 to determine a set of similarity scores. The computing device 102 may identify the document type of the scanned document as the document type of the template having the highest score. In a particular implementation, in response to each similarity score failing to exceed a threshold, the document data 122 may be provided to the administrator device 114 for use in generating a new template. Subsequent to identifying the document type, the computing device 102 may generate and store the first entry 142 in the document database 140. The first entry 142 may include values for the identifier 144 (e.g., "D1") and the document type indicator 146 (e.g., "inspection report").

After identifying the document type of the scanned document, the computing device 102 may extract entry data from an author field of the scanned document. To illustrate, the computing device 102 may access a template corresponding to the value of the document type indicator 146 to identify a location of the author field in the scanned document. The computing device 102 may extract author field data 160 from the location indicated by the template (e.g., the first template 132 if the first template 132 corresponds to the value of the document type indicator 146). For example, the computing device 102 may extract an image of the handwritten response to the author field from the location identified using the template.

The computing device 102 may transmit, from the network interface 118 to the second device 106 via a network, the author field data 160. A data entry technician at the second device 106 may enter and/or verify an identification of the author corresponding to the author field data 160. For example, the data entry technician may type in the name of the author to convert the handwritten name to data indicating the name. In some implementations, the document type may be associated with a group of authors, and a list of authors may be provided to the second device 106 in addition to the author field data 160. For example, the construction project may have three designated inspectors, and thus the inspection report may be associated with three potential authors. The computing device 102 may initiate display of a graphical user interface (GUI) at the second device 106 that displays the author field data 160 and the list of authors, and the data entry technician may select the name that is the closest match to the name corresponding to the author field data 160. Additionally or alternatively, after one or more author's signatures have been evaluated, the GUI may also display an author candidate set (e.g., one or more images of handwritten authors' names). To illustrate, the computing device 102 may generate a candidate set of authors' names as author names are evaluated, and the list of author names may include images of the authors' signatures. The GUI displayed at the second device may display one or more typed names (e.g., the list of author names) and one or more images of handwritten names (e.g., the candidate set of authors' names) to enable the data entry technician to evaluate the extracted responses. Because names of the authors may be private or secure data, in a particular implementation, to maintain a target level of security, the data entry technician that receives the author field data 160 may be an employee of a company that is responsible for a project associated with the scanned documents (or a contractor with a particular level of security or trust). In other implementations, the authors' names are not secure information, and the author field data 160 may be provided to any data entry technician.

After the data entry technician evaluates the author field data 160 (e.g., after the data entry technician selects a corresponding name from the GUI or enters the name manually), the computing device 102 may receive, from the second device 106, an author identification 162 indicating an author's name. The computing device 102 may update an indicator associated with the first entry 142 based on the author identification 162. For example, the computing device 102 may update the first entry 142 by storing the author's name in the author indicator 148 of the first entry 142.

After the first entry 142 in the document database 140 is associated with an author, the computing device 102 may determine whether a profile in the profile database 152 corresponds to the author. If there is no profile in the profile database that corresponds to the author, the computing device 102 may generate a new profile that corresponds to the author. The new profile may be indexed by the author, and may include a null set of candidate sets. As scanned documents corresponding to the author are processed, the computing device 102 may generate candidate sets associated with the new profile.

If there is no profile in the profile database 152 that corresponds to the author, the computing device 102 may retrieve a set of expected responses from a corresponding template. For example, if the scanned document has the same document type as the first template 132, the computing device 102 may retrieve the first set of expected responses 133 from the first template 132. Extracted responses from the scanned document data 122 and sets of expected responses may be provided as "data chunks" to devices of multiple data entry technicians for evaluation. The data chunks may be provided to other devices using a browser-based portal. To illustrate, the computing device 102 may store a first "data chunk" 164 in a database that is accessible via a browser-based portal, and a third device 108 may log into the browser-based portal and "pull" (e.g., initiate transmission of) the first data chunk 164. In response to the pull operation, the third device 108 may display (e.g., via a display device) the first data chunk 164 via a GUI, as further described with reference to FIGS. 3 and 4. In other implementations, the third device 108 may request data chunks from the computing device 102, and the computing device 102 may transmit the data chunks to the third device 108 via the network interface 118. The first data chunk 164 may include first field data (e.g., data indicating extracted responses in the first field of one or more documents having the same document type) and the first set of expected responses 133. Additionally, the first data chunk 164 may include field data (e.g., extracted responses) from fields having the same field type from other documents. For example, the first field type may be a yes/no field, and field data from a third field of another document may be included if the third field of the other document is a yes/no field.

The computing device 102 may receive, responsive to transmitting the first data chunk 164, first evaluation data 166 from the third device 108. The first evaluation data 166 may indicate one or more entries associated with the one or more fields. The first evaluation data 166 may be generated based on a data entry technician evaluating the extracted responses based on the first set of expected responses 133. For example, a data entry technician may select a closest entry in the first set of expected responses for each of the extracted responses via a GUI, as further described with reference to FIG. 3, and the first evaluation data 166 may be generated based on the data entry technician's input to the third device 108. The first evaluation data 166 may be transmitted from the third device 108 to the computing device 102, or the first evaluation data 166 may be stored in a database (or other type of storage) that is accessible to the computing device 102.

The computing device 102 updates an entry in the document database 140 based on the first evaluation data 166. For example, the computing device 102 may update an author indicator, such as the author indicator 148, based on the first evaluation data 166. The computing device 102 may also update an entry in the profile database 152 based on the first evaluation data 166. For example, the computing device 102 may add the image of the extracted response to a candidate set corresponding to the author and to the first field. To illustrate, the image of the extracted response (e.g., a signature) may be added to a candidate set of authors' names and/or to a candidate set of signatures associated with the author. In this manner, candidate sets for each author may be updated during processing of scanned documents by the computing device 102.

If there is a profile in the profile database 152 that corresponds to the author, the computing device 102 may retrieve, from the profile database 152, a first candidate set 124 associated with a first field of the scanned document based on the author (e.g., a value of the author indicator 148) and a first field type. As an example, the first field may be an address field (e.g., a field in an inspection report for entering an address at which the inspection occurred), and the first candidate set 124 may include data indicating three responses extracted from other scanned documents having the same document type (e.g., three examples of addresses written by the author on other instances of the document). Other candidate sets may include extracted responses from other fields (e.g., date fields, score fields, cost fields, requested item fields, yes/no fields, etc.)

Retrieving the first candidate set 124 may include accessing the profile database 152 based on the value of the author indicator 148 to retrieve the first candidate set 124. For example, the profile database 152 may be indexed by author name, and the processor 120 may retrieve the first candidate set 124 in response to matching the value of the author indicator 148 to an author name corresponding to the first profile 154. In some implementations, the first candidate set 124 may also correspond to other fields of other documents. For example, a different field of a second document type (e.g., a project completion checklist) may be an address field, and entries in the first candidate set 124 may also be extracted from scanned documents having the second document type. The processor 120 may retrieve a second candidate set 126 associated with a second field of the scanned document based on the author and a second field type. The processor 120 may also retrieve additional candidate sets, including an Nth candidate set 128 that is associated with an Nth field of the scanned document, based on the author and an Nth field type.

Extracted responses from the scanned document data 122 and candidate sets may be provided, via the browser-based portal, as data chunks to devices of multiple data entry technicians for evaluation. To illustrate, the computing device 102 may provide a second data chunk 168 to a fourth device 110, either by transmitting the second data chunk 168 via the network interface 118 or by storing the second data chunk 168 in a database (or other type of storage) that is accessible to the fourth device 110. The fourth device 110 may pull (e.g., initiate transmission of) the second data chunk 168 from a database (or other type of storage). The second data chunk 168 may include second field data (e.g., data indicating extracted responses in the second field of one or more documents having the same document type) and the first candidate set 124. Additionally, the second data chunk 168 may include field data (e.g., extracted responses) from other documents corresponding to the author and having a different document type. For example, the second field type may be a date field, and field data from a third field of another document may be included if the third field of the other document is a date field and the documents have the same author.

In a particular implementation, the network interface 118 is configured to receive identification data (e.g., the author identification 162) from the second device 106 responsive to generation (and storage or transmission) of first data (e.g., the author field data 160). The first data (e.g., the author field data 160) may be associated with an author field of a scanned document, and the identification data may indicate an author corresponding to the author field. Responsive to execution of the instructions 117, the processor 120 may be configured to update an indicator (e.g., the author indicator 148) associated with the first entry 142 in the document database 140. The first entry 142 may correspond to the scanned document. The processor 120 may be further configured to initiate transmission of a data chunk (e.g., the second data chunk 168) to another device (e.g., the fourth device 110) via the network interface 118. Additionally or alternatively, the processor 120 may initiate storage of the data chunk in a database (or other type of storage) that is accessible to other devices (e.g., including the fourth device 110). The data chunk may include a candidate set (e.g., the first candidate set 124) associated with the author and a field of a first field of the scanned document.

The computing device 102 may receive, responsive to generation (and storage or transmission) of the second data chunk 168, second evaluation data 170. The second evaluation data 170 may be received directly (or indirectly) from the fourth device 110, or the second evaluation data 170 may be pulled from a designated database (or other type of storage that is accessible to the fourth device 110). The second evaluation data 170 may indicate one or more entries associated with the one or more fields. The second evaluation data 170 may be generated based on a data entry technician evaluating the extracted responses based on the first candidate set 124. For example, a data entry technician may select a closest entry in the first candidate set 124 for each of the extracted responses via a GUI, as further described with reference to FIG. 4, and the second evaluation data 170 may be generated based on the data entry technician's input to the fourth device 110.

The computing device 102 may provide an Nth data chunk 172 to an Nth device 112 (e.g., via transmission or via storage in a database that is accessible to the Nth device 112). The Nth data chunk 172 may include an Nth candidate set 128 and Nth field data (e.g., data indicating extracted responses in the Nth field or in fields of other documents having the same field type and corresponding to the author). The computing device 102 may receive Nth evaluation data 174, similarly to the evaluation data 166 and 170. By providing field data for different fields (or different portions of fields) to different data entry technicians (e.g., N technicians as illustrated in FIG. 1) based on the type of field from which the responses are extracted from, the system 100 reduces security risks by spreading data associated with the author among multiple data entry technicians. A more detailed example of routing the extracted responses and candidate sets as data chunks is described with reference to FIG. 2.

Data chunks are provided to different data entry technicians based on field types of the extracted responses. For example, a data chunk that includes extracted responses from a first field is provided to a different data entry technician than a data chunk that includes extracted responses from a second field. Because extracted responses for a particular field (or set of fields) are provided to each data entry technician, each data entry technician is exposed to a small portion of information related to a few fields of a few different document types. The fields are divided among data entry technicians such that no data entry technician receives more than one field (or a few fields) from a particular document type (e.g., corresponding to a particular template). Accordingly, a data entry technician does not have sufficient information to reconstruct any particular document. Thus, no data entry technician is exposed to enough information to constitute a security risk. In a particular implementation, data chunks are provided to N data entry technicians. N is an integer and may be selected based on a cost, speed, and security considerations. To illustrate, a larger number of data entry technicians used to evaluate data increases a speed of the evaluation process and increases security (e.g., by spreading out information among more data entry technicians) while also increasing a cost. Reducing the number of data entry technicians reduces the cost while also reducing the speed and decreasing the security (e.g., by providing more data to each data entry technician).

Additionally, because the data entry technician is evaluating extracted responses using a set of expected responses or a candidate set, the data entry technician is selecting a closest match between an expected value (or a candidate value) and an extracted response. Selecting a closest match is faster and less prone to error than manually typing in each extracted response. Additionally, because the candidate set includes images of handwriting by the author of a corresponding extracted response, the data entry technician may be able to match an entry to a handwritten sample without having to understand the word (or words) included in the extracted response. Because the candidate sets include images of handwritten responses by the same author, the entries in the candidate set appear more similar to the extracted response (e.g., an image of a handwritten response) than text displayed in the GUI.

The computing device 102 may be configured to update one or more entries in the document database 140 based on the first evaluation data 166, the second evaluation data 170, the Nth evaluation data 174, or a combination thereof. For example, in response to receiving the first evaluation data 166, the computing device 102 may update the one or more fields 150 of the first entry 142 to indicate an evaluated entry indicated by the first evaluation data 166. As a particular example, if the first evaluation data 166 indicates a selected entry of "First St.," the computing device 102 may update a corresponding field (e.g., an address field) of the one or more fields 150 with a value corresponding to "First St." Additionally, if the first evaluation data 166 indicates evaluated entries of other documents, other entries in the document database 140 may be updated based on the first evaluation data 166. The computing device 102 may update entries in the document database 140 based on the second evaluation data 170 and the Nth evaluation data 174 in a similar manner.

In a particular implementation, the computing device 102 may be configured to perform one or more fraud detection operations to confirm entries in fields of the scanned documents, such as the author field. To illustrate, the computing device 102 may be configured to store an image of each signature that is associated with an author. When a scanned document is processed and a corresponding author identification is received from a device of a data entry technician, the computing device 102 may compare the image of the signature to the other images of signatures associated with the author. The comparison may be an image-based comparison, a pixel-based comparison, a multi-point comparison, an electronic handwriting comparison operation, or another form of comparison. Each comparison may generate a similarity value (in the same manner as the similarity value between the extracted identifying information and the templates). The computing device 102 may identify a particular signature as an inappropriate signature in response to each similarity value for the signature failing to exceed a threshold.

To illustrate, if a different author forges a signature (e.g., if "Steve" forges "Bob's" signature), the forged signature represents an inappropriate value and is indicative of fraud. The computing device 102 may compare the extracted response from the author field (e.g., the forged signature) to other images of signatures associated with "Bob." In response to determining that the forged signature results in similarity values that do not exceed a threshold, the computing device 102 may identify the forged signature as an inappropriate response. The computing device 102 may initiate an appropriate action (e.g., a fraud management action) in response to determining that the signature is an inappropriate response. For example, the computing device 102 may initiate transmission of data indicating the inappropriate response to the administrator device 114, and an administrator may determine whether to take action if the inappropriate response represents possible fraud or to update the group of signatures associated with the author if the signature is a new, legitimate response.

After the entries in the document database 140 are updated to include values of responses to the fields in the scanned documents (corresponding to the scanned document data 122), the entries may be used as structured data to enable processing and analyzing using various data analysis techniques or algorithms. For example, the computing device 102 may be configured to perform database queries to the document database 140 based on an author. In this manner, information associated with a particular author may be quickly and easily accessible. Additionally, the entries in the document database 140 may be used to generate reports or visual presentations that indicate a status of the construction project. For example, the computing device 102 may initiate display of a GUI based on the entries in the document database 140. The GUI may include one or more selectable indicators that enable a user to be provided with time-varying and location-varying information related to the construction project. An example of a GUI that is generated based on the entries in the document database 140 is further described with reference to FIG. 5.

In a particular implementation, the computing device 102 may support receiving and processing data from other devices. For example, an inspector may be equipped with a mobile electronic device 180, such as a mobile telephone, a tablet device, a laptop computer, a personal digital assistant (PDA), or some other mobile device, that is installed with an inspection application or that is able to access (e.g., via a browser-based portal) an inspection program on the Internet. The inspector may perform an inspection of a location related to the construction project and may enter information into the mobile electronic device 180 (e.g., via an input device, such as a keyboard or a touchscreen as two non-limiting examples). The mobile electronic device 180 may generate mobile data 182 based on the user input from the inspector. The mobile data 182 may indicate responses to fields in an electronic version of a document, such as an electronic version of the inspection report. The computing device 102 may receive the mobile data 182 and generate an entry in the document database 140 based on the mobile data 182. For example, the computing device 102 may generate an entry for a new inspection report (or another document type indicated by the mobile data 182) based on the mobile data 182. An author indicator of the entry may be set based on a user identifier included in the mobile data 182 (or accessed via another source, such as an employee database that correlates mobile device identifiers with user identifiers). The fields of the entry may be set based on the mobile data 182. Thus, the system 100 may support interoperability of physical documents (e.g., "analog" documents) and digital data (e.g., data generated by other devices, such as mobile devices) in a single database (e.g., the document database 140).

In another particular implementation, the system 100 may support data formatted according to a legacy format. For example, the computing system may receive legacy data that indicates information stored in one or more physical documents. The legacy data may have a different format than the data in the document database 140. The computing device 102 may be configured to convert the legacy data to one or more entries in the document database 140. In a particular implementation, the format of the document database 140 may be configured such that the legacy data maps to elements of the entries in the document database 140. In this implementation, the conversion may be an automated process performed by the computing device 102. Additionally or alternatively, the computing device 102 may be configured to extract responses from the legacy data and to provide the extracted responses to the devices 106-112 for evaluation by data entry technicians, similar to the processing of the scanned documents described above. The computing device 102 may receive evaluation data responsive to routing the extracted responses from the legacy data, and the computing device 102 may generate entries (or update existing entries) in the document database 140 based on the evaluation data, as described above. Thus, the system 100 may support conversion of legacy data (e.g., data formatted in accordance with other formats) into structured data.

In a particular implementation, the network interface 118 is configured to receive identification data (e.g., the author identification 162) from the second device 106 responsive to transmission of first data (e.g., the author field data 160) to the second device 106. The first data (e.g., the author field data 160) is associated with an author field of a scanned document, and the identification data (e.g., the author identification 162) indicates an author corresponding to the author field. In this implementation, the instructions 117, when executed by the processor 120, cause the processor 120 to update an indicator (e.g., the author indicator 148) associated with the first entry 142 in the document database 140 and to initiate transmission of a data chunk (e.g., the second data chunk 168) to another device (e.g., the fourth device 110) via the network interface 118. The data chunk includes the first candidate set 124 associated with a first field of the scanned document based on the author and a first field type. The I/O interface 119 may be configured to receive document data (e.g., the scanned document data 122) corresponding to the scanned document from the scanner 104 and the processor 120 may store the first entry 142 in the document database 140. The first entry 142 may include an identifier (e.g., the document type indicator 146) associated with the scanned document and a document type corresponding to the scanned document. The network interface may be further configured to receive, responsive to transmission of the data chunk, evaluation data (e.g., the second evaluation data 170) from the fourth device 110. The instructions 117 may further cause the processor 120 to access the profile database 152 based on the author to retrieve the candidate set (e.g., the first candidate set 124).

During operation, the scanner 104 may scan a physical document, such as an inspection report, to generate the scanned document data 122. The computing device 102 may receive the scanned document data 122 from the scanner 104 via the I/O interface 119. The computing device 102 may determine whether an orientation of the scanned document indicated by the scanned document data 122 matches a target orientation (e.g., an orientation associated with a template in the document template database 130). In response to determining that the orientation does not match the target orientation, the computing device 102 may perform one or more rotation operations and/or one or more alignment operations to orient the scanned document.

The computing device 102 may process at least a portion the scanned document data 122 to identify the document type corresponding to the scanned document. For example, the computing device 102 may extract a portion of the scanned document including identifying information, and the computing device 102 may compare the extracted portion to identifying information associated with each template in the document template database 130 to generate similarity scores. Based on the similarity scores, the computing device 102 may identify the document type of the scanned document. For example, based on a similarity score that indicates that the extracted portion matches identifying information for an inspection report (e.g., the document type of the first template 132), the computing device 102 may identify the scanned document as an inspection report. The computing device 102 may generate the first entry 142 in the document database 140, and the computing device 102 may set the value of the identifier 144 and the document type indicator 146.

The computing device 102 may access the document template database 130 based on the value of the document type indicator 146 to identify a corresponding template. For example, if the first template 132 is an inspection report template, the computing device 102 may access the first template 132 based on the value of the document type indicator 146. The first template 132 may indicate locations of multiple fields within the scanned document. The computing device 102 may determine a location of an author field based on the first template 132 and the computing device 102 may extract the author field data 160 (e.g., an image of a handwritten response to the author field) from the scanned document. For example, the computing device 102 may extract a portion of image data illustrating a signature of "Bob" (e.g., the author).

After extracting the author field data 160, the computing device 102 may the author field data 160 to the second device 106. For example, the computing device 102 may store the author field data in a database (or other type of storage) that is accessible to a browser-based portal executed by the second device 106. Alternatively, the computing device 102 may transmit the author field data 160 from the network interface 118 to the second device 106. A data entry technician at the second device 106 may evaluate the author field data 160, such as by entering the name on a user input device (e.g., a keyboard, a keypad, a touchscreen, etc.) or by selecting a closest matching entry from a list of expected authors displayed by a GUI at the second device 106. The second device 106 may generate the author identification 162 based on the data entry technician's input. The computing device 102 may receive the author identification 162 from the second device 106. The author identification 162 may indicate the author (e.g., "Bob") identified by the data entry technician. The computing device 102 updates an indicator based on the author identification 162 by setting a value of the author indicator 148 of the first entry 142 to a value corresponding to "Bob."

The computing device 102 may extract responses to other fields (e.g., images of handwritten responses to the other fields) from the scanned document in order to provide the extracted responses to other devices (e.g., via transmission to the other devices or via storage in a designated database that is accessible via a browser-based portal). The computing device 102 may determine whether the author (e.g., "Bob") is associated with a profile in the profile database 152. If the author is not associated with a profile in the profile database 152, the computing device 102 may retrieve a set of expected responses, such as the first set of expected responses 133, from the corresponding template. The first set of expected responses 133 may include one or more expected responses to a particular field of a scanned document, such as known authors, known addresses of locations associated with the construction project, indications of yes or no, scores, etc. If the author is associated with a profile in the profile database 152, the computing device 102 may retrieve a candidate set associated with the author and the field type in addition to retrieving the set of expected responses.

The computing device 102 may transmit the first data chunk 164 to the third device 108 via the network interface 118. The first data chunk 164 includes first field data (e.g., the extracted responses to the first field) and the first set of expected responses 133 (or the first set of expected responses 133 and a candidate set). A data entry technician using the third device 108 may evaluate the first field data based on the first set of expected responses 133 (or the first set of expected responses 133 and the candidate set). For example, the data entry technician may select a closest match to the extracted responses from the entries in the first set of expected responses 133, as further described with reference to FIG. 3. The third device 108 may generate the first evaluation data 166 based on user input from the data entry technician indicating the selection, and the computing device 102 may receive the first evaluation data 166 from the third device 108. For example, the third device 108 may transmit the first evaluation data 166 to the computing device 102, or the third device 108 may store the first evaluation data 166 in a designated database that is accessible to the computing device 102. Additional fields of the scanned document may be evaluated in a similar manner, and the evaluated data may be used to generate candidate sets and author profiles, as described above.

The computing device 102 may process additional scanned documents as described above. After identifying an author of another scanned document, if the computing device 102 determines that the author of the scanned document has a profile in the profile database 152, the computing device 102 may retrieve the first candidate set 124 based on the author and a first field type. The first candidate set 124 may include one or more responses in the first field extracted from other documents corresponding to the author. For example, the first field may be an address field, and the first candidate set 124 may include three street addresses that are extracted from other documents associated with the author "Steve."

The computing device 102 may transmit the second data chunk 168 to the fourth device 110 via the network interface 118. The second data chunk 168 includes first field data (e.g., the extracted responses to the first field), a second set of expected responses, and the first candidate set 124. A data entry technician using the fourth device 110 may evaluate the first field data based on the first candidate set 124 and/or the second set of expected responses. For example, the data entry technician may select a closest match to the extracted responses from the entries in the first candidate set 124 and/or the second set of expected responses, as further described with reference to FIG. 4. The fourth device 110 may generate the second evaluation data 170 based on user input from the data entry technician indicating the selection, and the computing device 102 may receive the second evaluation data 170 from the fourth device 110 (e.g., via a transmission from the fourth device 110 or via storage of the second evaluation data 170 in a database that is accessible to the computing device 102). The computing device 102 may similarly provide the Nth data chunk 172 to the Nth device 112, and the computing device 102 may receive the Nth evaluation data 174 from the Nth device 112.

As (or after) entries for a plurality of documents are evaluated by the data entry technicians, the evaluation data may be used by the computing device 102 to update the document database 140 by storing data based on the evaluation data as the fields (e.g., the one or more fields 150) of the entries. The entries of the document database 140 (e.g., the structured data) may be used to perform data analysis operations and to generate a GUI to enable user perception of information related to the construction project, as further described with reference to FIG. 5.

Thus, the computing device 102 of FIG. 1 enables generation of structured data based on multiple physical (e.g., "analog") documents at less cost and faster than other systems, such as systems that use manual data entry for each physical document or document scanning. Because the computing device 102 provides data for the same field to the same data entry technician, a data entry technician may be provided with a set of expected responses or a candidate set, which improves efficiency of the data entry technician as compared to evaluating only the extracted response. Improving the efficiency of the process of converting scanned documents to structured data improves the speed and operating efficiency of the computing device 102. Additionally, converting the scanned documents to structured data (e.g., the entries in the document database 140) enables the computing device 102 to support database queries, generation of reports, and visual displays based on entries to fields in the physical documents, which improves the data processing and analysis capabilities of the computing device 102. Extracting the author information for each document and including author as part of each entry in the document database enables database queries and generation of reports (or visual displays) of information associated with a particular author, which is information that is unavailable in other systems. Additionally, the information provided by the reports and the GUIs may be information that is required by laws, regulations, or an industry standard. Because the information is provided quickly in an easy-to-use format, the system 100 may reduce cost and time associated with an owner or primary contractor of a construction project complying with laws, regulations, and/or industry standards.

The system 100 also supports generation of structured data based on scanned documents and digital data (e.g., data from other devices, such as the mobile electronic device 180), which enables information generated using a variety of different means (e.g., physical documents, data generated by mobile devices, etc.) to be stored and processed in a single format. Enabling support for multiple types of documents (e.g., physical or digital) may enable an owner or primary contractor associated with a construction project to obtain data from multiple subcontractors that do not store information in the same way. Thus, the owner or primary contractor of the construction project may be able to use a single system to interact with some subcontractors that use physical documents to store information, such as information related to inspection reports, and other subcontractors that use electronic devices to store the information.

Additionally, because the extracted data is spread out among multiple data entry technicians and is only provided as responses to fields (and not an entirety of a scanned document), each data entry technician only receives a small portion of the information. Controlling the amount of exposure of the data entry technicians improves security by preventing the data entry technicians from ascertaining the entirety of the information in a scanned document during the data evaluation process. The system 100 also improves security by using author identification information to enable fraud detection. For example, the system 100 identifies inappropriate responses, such as forged signatures, by comparing images of signatures to determine whether a signature is likely a forged signature. The system 100 also enables greater understanding and analysis of the construction project through analysis of the structured data (e.g., the entries in the document database 140) and display of a GUI.

Figure 2:
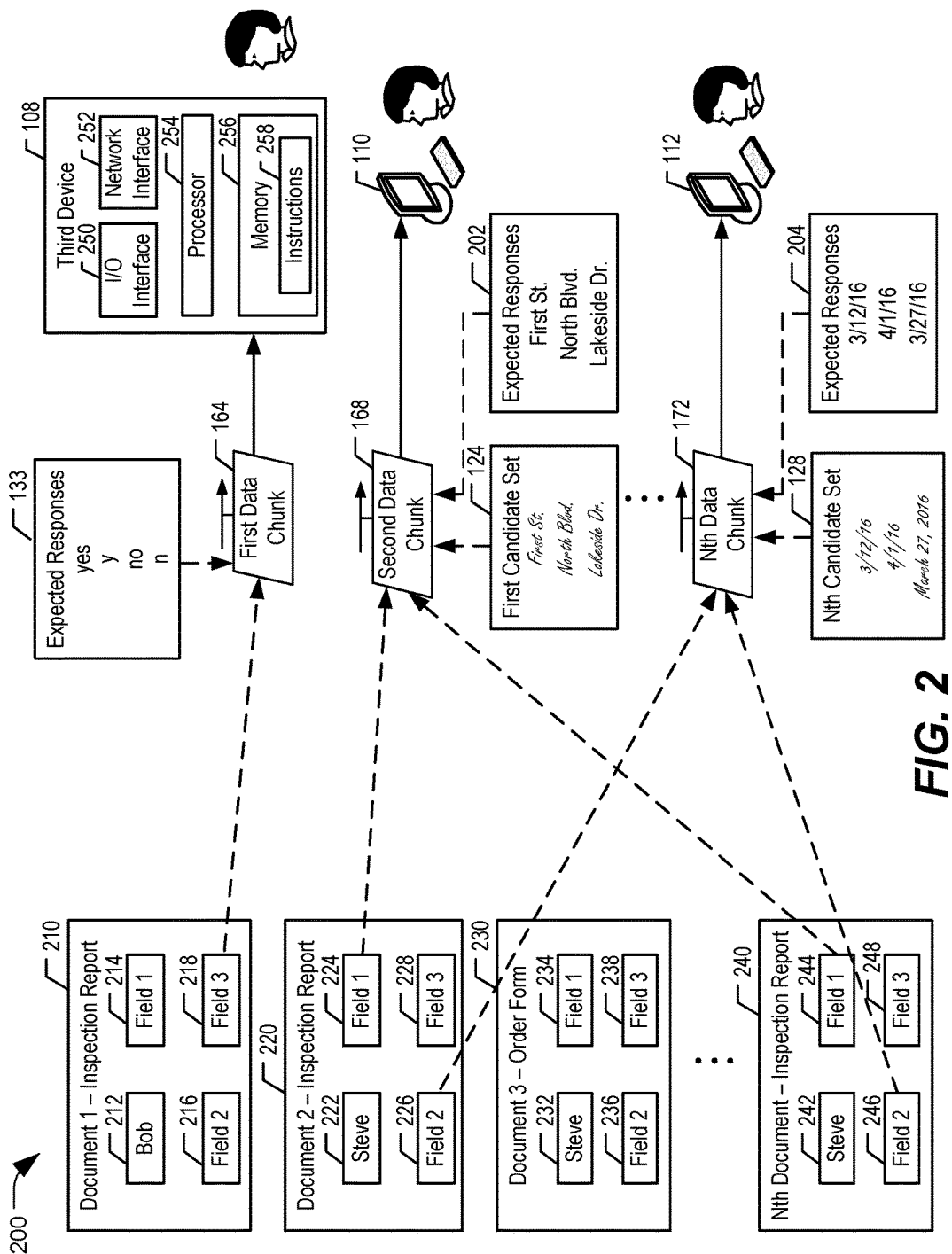
FIG. 2 is a diagram illustrating routing of candidate sets and extracted field data from different scanned documents to different data entry technicians.

FIG. 2 depicts a diagram 200 illustrating routing of candidate sets and extracted field data from different scanned documents to different data entry technicians. The routing of the extracted field data and the candidate sets depicted in FIG. 2 may be performed by the computing device 102 of FIG. 1. FIG. 2 depicts four documents being processed to generate structured data for storage in the scanned documents database 140: a first document 210, a second document 220, a third document 230, and an Nth document 240. The first document 210 includes a first author field 212 and fields 214-218, the second document 220 includes a second author field 222 and fields 224-228, the third document 230 includes a third author field 232 and fields 234-238, and the Nth document includes an Nth author field 242 and fields 244-248.

In the particular example illustrated in FIG. 2, the first document 210 is a first inspection report, the second document 220 is a second inspection report, the third document 230 is an order form, and the Nth document 240 is a third inspection report. Additionally, as indicated by a value of the first author field 212, the author of the first document 210 is "Bob." As indicated by values of the second author field 222, the third author field 232, and the Nth author field 242, the author of the second document 220, the third document 230, and the Nth document 240 is "Steve." The example illustrated in FIG. 2 is not limiting. For example, the scanned documents to be processed may include more than four or fewer than four documents and the documents may be different types and different authors than illustrated in FIG. 2.

Because the first document 210, the second document 220, and the Nth document 240 have the same document type (e.g., inspection report), the first document 210, the second document 220, and the Nth document 240 have the same types of data fields in the same locations within the scanned documents. For example, the fields 214, 224, and 244 may be address fields, the fields 216, 226, and 246 may be date fields, and the fields 218, 228, and 248 may be yes/no fields. Because the third document 230 has a different document type (e.g., order form), the third document 230 may have different types of data fields than the documents 210, 220, and 240. For example, field 234 may be a date field, field 236 may be an item field, and field 238 may be an address field. In some implementations, different documents may have at least one field in common. For example, each of the scanned documents 210-240 includes a date field (e.g., the fields 216, 226, 234, and 246) and an address field (e.g., the fields 214, 224, 238, and 244).

Responses to the fields of the scanned documents 210-240 may be extracted. Along with sets of expected responses and/or candidate sets, the extracted responses be provided to the devices 108-112 as data chunks, as described with reference to FIG. 1. For example, the data chunks may be stored in a database (or a device capable of storing the data chunks) that is accessible to the devices 108-112 via a browser-based portal. Alternatively, the data chunks may be transmitted from the computing device 102 to the devices 108-112. The field data (e.g., the extracted responses) may be provided to particular devices (e.g., particular data entry technicians) based on the type of the data field. For example, the first data chunk 164 may include a response extracted from a yes/no field (e.g., field 218) from an inspection report. In this example, "Bob" does not correspond to a profile in the profile database 152 at the time that the first document 210 is processed. Thus, the first set of expected responses 133 is included in the first data chunk 164. In some implementations, yes/no fields from other documents, such as other inspection reports, may be included in the first data chunk 164. In these implementations, corresponding candidate sets (if authors of the other documents correspond to profiles in the profile database 152) may be included in the first data chunk 164.

The second data chunk 168 may include responses extracted from address fields (e.g., fields 224, 244) from inspection reports authored by "Steve." Because the extracted responses come from documents that are authored by "Steve," the second data chunk 168 also includes the first candidate set 124 and a second set of expected responses 202. The first candidate set 124 may include one or more address values (e.g., "First St.," "North Blvd.," "Lakeside Dr.") extracted from address fields of other scanned documents authored by "Steve." The second set of expected responses 202 includes one or more expected address values (e.g., "First St.," "North Blvd.," "Lakeside Dr."). The first candidate set 124 and the second set of expected responses 202 may include the same values, or one or more values may be different between the first candidate set 124 and the second set of expected responses 202. The Nth data chunk 172 may include responses extracted from date fields (e.g., fields 226, 246) from inspection reports authored by "Steve." Because the extracted responses come from documents that are authored by "Steve," the Nth data chunk 172 also includes the Nth candidate set 128 and a third set of expected responses 204. The Nth candidate set 128 may include one or more date values (e.g., "3/12/16," "4/1/16," "Mar. 27, 2016") extracted from date fields of other scanned documents authored by "Steve." The third set of expected responses 204 includes one or more expected data values (e.g., "3/12/16," "4/1/16," "3/27/16"). In other implementations, the data chunks 164, 168, and 172 may include different field data (e.g., different extracted responses) and different expected responses or candidate sets.

The field data (e.g., the extracted responses) and the corresponding set of expected responses and/or candidate set may be packaged as a data chunk and provided to a device based on the field type. For example, the first data chunk 164 may be provided to the third device 108 based on the first data chunk 164 including responses extracted from yes/no fields of documents. The second data chunk 168 may be provided to the fourth device 110 based on the second data chunk 168 including responses extracted from address fields of documents. The Nth data chunk 172 may be provided to the Nth device 112 based on the Nth data chunk 172 including responses extracted from date fields of documents.

Each of the devices 108-112 are configured to access the data chunks and to initiate display of a GUI as part of a part of a browser-based portal to enable a corresponding data entry technician to evaluate the data chunk. To illustrate, the third device 108 includes a processor 254, a memory 256, an I/O interface 250, and a network interface 252. The memory 256 stores instructions 258 that cause the processor 254 to perform the operations described herein. In a particular implementation, the memory 256 includes or corresponds to a computer-readable storage device (e.g., a non-transitory computer-readable medium). The network interface 252 may be configured to receive the first data chunk 164 (e.g., from the computing device 102 of FIG. 1 or from a database or other device), the first data chunk 164 including the first set of expected responses 133 associated with the field 218. The first candidate set 124 also includes the field data (e.g., extracted responses) of the field 218. The I/O interface 250 may be configured to receive input data (e.g., from a data entry technician) in response to display of a GUI based on the first set of expected responses 133. An example of a GUI based on a set of expected values is further described and illustrated with reference to FIG. 3.

The third device 108 (e.g., the processor 254) may be configured to initiate display of the GUI in response to receiving the first data chunk 164 via the network interface 252. The processor 254 may be configured to generate evaluation data (e.g., the first evaluation data 166 of FIG. 1) based on the input data received via the I/O interface 250. The evaluation data may indicate selection of an entry included in the set of expected responses 133 as a closest match to an extracted field response. The processor 254 may be further configured to initiate transmission of the evaluation data (e.g., to the computing device 102 of FIG. 1) via the network interface 252. The fourth device 110 and the Nth device 112 may include similar components and be configured in a similar manner to the third device 108. For example, the fourth device 110 may access the second data chunk 168 and initiate display of a GUI that includes the extracted responses (e.g., fields 224 and 244) and the first candidate set 124. An example of a GUI based on a candidate set is further described with reference to FIG. 4. The fourth device 110 may generate evaluation data (e.g., the second evaluation data 170 of FIG. 1) based on input data received via an I/O interface. The Nth device 112 may be similarly configured to access the Nth data chunk 172 and to generate the Nth evaluation data 174 of FIG. 1. The evaluation data may be used by the computing device 102 to generate structured data, as described with reference to FIG. 1.

Because each data entry technician receives extracted field data in addition to sets of expected responses and/or candidate sets, efficiency of data evaluation is improved. For example, matching an extracted response to an expected answer or to an entry in a candidate set may be faster, easier, and less prone to error than manually entering a value for the extracted response. Thus, data evaluation is more efficient than if each data entry technician received extracted field data without a set of expected responses or a candidate set. Additionally, because each data entry technician only receives responses for one (or a few) data fields, each data entry technician is not exposed to an entirety of a scanned document, which improves security for scanned documents that include confidential or secure information.

Referring to FIG. 3, an implementation of an entry evaluation graphical user interface (GUI) 300 is shown. In a particular implementation, the GUI 300 may be displayed by the third device 108 of FIGS. 1-2. In other implementations, the GUI 300 may be displayed by the fourth device 110 of the Nth device 112 based on data chunks received by the fourth device 110 or the Nth device 112. The GUI 300 may be part of a browser-based portal that is configured to "pull" data chunks for display to a data entry technician, as described with reference to FIG. 1. The GUI 300 presents a "current entry" 302 that corresponds to the first field data of the first data chunk 164 received by the third device 108 from the computing device 102 via the network interface 118. The GUI 300 displays the first set of expected responses 133 as a group of entries 304, each entry having a selectable indicator 306. In some implementations, the selectable indicator 306 includes a check box or button that is selectable by a user input.

The data entry technician operating the third device 108 may evaluate the current entry 302 by comparing the current entry 302 to the group of entries 304 and using the selectable indicator 306 to select the entry of the group of entries 304 that most closely matches the current entry 302. The group of entries 304 may displayed text of one or more expected responses to a particular field of a document that enable quick and efficient determination of whether a current entry matches the entries of the first set of expected responses 133. If the data entry technician determines that no entry in the group of entries 304 matches the current entry 302, the data entry technician may select an entry corresponding to "None of the Above." Additionally, in some implementations, the GUI 300 may display a configurable entry 307. The data entry technician may use the configurable entry 307 to enter a value that corresponds to the current entry 302.

The GUI 300 may also display an adjustable score indicator 308. In a particular implementation, the adjustable score indicator 308 may display a score and include one or more buttons to enable the data entry technician to adjust the score. The score may indicate a likelihood of a "match" between the current entry 302 and the entry selected via the selectable indicator 306, as judged by the data entry technician. The data entry technician may select a value for the score using the adjustable score indicator 308 to approximate the technician's subjective evaluation of the likelihood of a "match" between the current entry 302 and the entry selected via the selectable indicator 306 by the technician.

If the data entry technician makes an error, the technician may use a "clear" command button 312 to correct the selectable indicator 306, the configurable entry 307, or the adjustable score indicator 308. Alternatively, after the data entry technician has completed the evaluation, the data entry technician may use a "submit" command button 310 to instruct the third device 108 to generate and transmit the first evaluation data 166 to the computing device 102. The computing device 102 receives, responsive to transmission of the first data chunk 164, the first evaluation data 166 from the third device 108. The first evaluation data 166 includes data representative of one or more entries associated with the one or more fields.

As an illustrative example of operation, the computing device 102 transmits the first data chunk 164 to the third device 108 via the network interface 118. The first field data of the first data chunk 164 includes data from a yes/no field. The third device 108 displays the first field data via the GUI 300 as the current entry 302. The current entry 302 includes the letter "N" in handwritten text. The third device 108 also displays the group of entries 304, each entry next to the corresponding selectable indicator 306. The data entry technician operating the third device 108 compares the current entry 302 to the group of entries 304 and use the selectable indicator 306 to select the entry that most closely resembles the current entry. For example, because the current entry 302 includes "N", the data entry technician selects the entry "No/N" from the group of entries 304 using the selectable indicator 306. The data entry technician also selects a value for a likelihood score using the adjustable score indicator 308 to approximate the technician's subjective evaluation of the "match" between the "N" value of the current entry 302 and the "No/N" entry of the group of entries 304. In this example, the data entry technician feels there is strong likelihood of a match, so the technician sets the adjustable score indicator 308 to a value of "95%." The data entry technician uses the "submit" command button 310 to instruct the third device 108 to generate and transmit the first evaluation data 166 to the computing device 102.

The GUI 300 enables efficient evaluation of extracted field data. Because each data entry technician receives extracted field data and sets of expected responses associated with the field, each data entry technician is only exposed to a particular subset of likely responses (e.g., indicated by the set of expected responses). Thus, the data entry technician is able to select one of the group of entries 304 as a match to each entry (e.g., each extracted data field) faster and more efficiently than if the data entry technician were responsible for evaluating entries by entering values manually. Improving the efficiency of data evaluation improves the speed with which the computing device 102 generates structured data.

Referring to FIG. 4, an implementation of an entry evaluation graphical user interface (GUI) 400 is shown. In a particular implementation, the GUI 400 may be displayed by the fourth device 110 of FIGS. 1-2. In other implementations, the GUI 400 may be displayed by the third device 108 of the Nth device 112 based on data chunks received by the third device 108 or the Nth device 112. The GUI 400 may be part of a browser-based portal that is configured to "pull" data chunks for display to a data entry technician, as described with reference to FIG. 1. The GUI 400 presents a "current entry" 402 that corresponds to the field data of the second data chunk 168 received by the fourth device 110 from the computing device 102 via the network interface 118. The GUI 400 displays the first candidate set 124 and/or the second set of expected responses 202 as a group of entries 404, each entry having a selectable indicator 406. In some implementations, the selectable indicator 406 includes a check box or button that is selectable by a user input.

The data entry technician operating the fourth device 110 may evaluate the current entry 402 by comparing the current entry 402 to the group of entries 404 and using the selectable indicator 406 to select the entry of the group of entries 404 that most closely matches the current entry 402. The group of entries 404 may include handwriting samples (e.g., the responses indicated by the first candidate set 124) that enable quick and efficient determination of whether a current entry matches the entries of the first candidate set 124. The group of entries 404 may also include computer generated text (e.g., based on one or more of the second set of expected responses 202). As illustrated in FIG. 4, entries from the first candidate set 124 include "First St." and "North Blvd.", and entries from the second set of expected responses 202 include "Lakeside Dr." As documents by the author are processed and more entries are added to the first candidate set 124, more handwritten entries appear in the GUI 400. If the data entry technician determines that no entry in the group of entries 404 matches the current entry 402, the data entry technician may select an entry corresponding to "None of the Above." Additionally, in some implementations, the GUI 400 may display a configurable entry 407. The data entry technician may use the configurable entry 407 to enter a value that corresponds to the current entry 402.

The GUI 400 may also display an adjustable score indicator 408. In a particular implementation, the adjustable score indicator 408 may display a score and include one or more buttons to enable the data entry technician to adjust the score. The score may indicate a likelihood of a "match" between the current entry 402 and the entry selected via the selectable indicator 406, as judged by the data entry technician. The data entry technician may select a value for the score using the adjustable score indicator 408 to approximate the technician's subjective evaluation of the likelihood of a "match" between the current entry 402 and the entry selected via the selectable indicator 406 by the technician.

If the data entry technician makes an error, the technician may use a "clear" command button 412 to correct the selectable indicator 406, the configurable entry 407, or the adjustable score indicator 408. Alternatively, after the data entry technician has completed the evaluation, the data entry technician may use a "submit" command button 410 to instruct the third device 108 to generate and transmit the first evaluation data 166 to the computing device 102. The computing device 102 receives, responsive to transmission of the first data chunk 164, the first evaluation data 166 from the third device 108. The first evaluation data 166 includes data representative of one or more entries associated with the one or more fields.

As an illustrative example of operation, the computing device 102 transmits the second data chunk 168 to the fourth device 110 via the network interface 118. The first field data of the second data chunk 168 includes data from an address field. The fourth device 110 displays the first field data via the GUI 400 as the current entry 402. The current entry 402 includes the address "First St." in handwritten text. The fourth device 110 also displays the group of entries 404, each entry next to the corresponding selectable indicator 406. The data entry technician operating the fourth device 110 compares the current entry 402 to the group of entries 404 and use the selectable indicator 406 to select the entry that most closely resembles the current entry. For example, because the current entry 402 includes "First St.", the data entry technician selects the entry "First St." from the group of entries 404 using the selectable indicator 406. The data entry technician also selects a value for a likelihood score using the adjustable score indicator 408 to approximate the technician's subjective evaluation of the "match" between the "First St." value of the current entry 402 and the "First St." entry of the group of entries 404. In this example, the data entry technician feels there is strong likelihood of a match, so the technician sets the adjustable score indicator 408 to a value of "90%." The data entry technician uses the "submit" command button 410 to instruct the fourth device 110 to generate and transmit the second evaluation data 170 to the computing device 102.

The GUI 400 enables efficient evaluation of extracted field data. Because each data entry technician receives extracted field data and candidate sets associated with the same author (or a small number of authors), each data entry technician is only exposed to a particular author's (or a small number of authors') handwriting and to a particular subset of likely responses (e.g., indicated by the candidate set). Thus, the data entry technician is able to select one of the group of entries 404 as a match to each entry (e.g., each extracted data field) faster and more efficiently than if the data entry technician were responsible for evaluating entries associated with a large number of authors. Improving the efficiency of data evaluation improves the speed with which the computing device 102 generates structured data.

Figure 5:
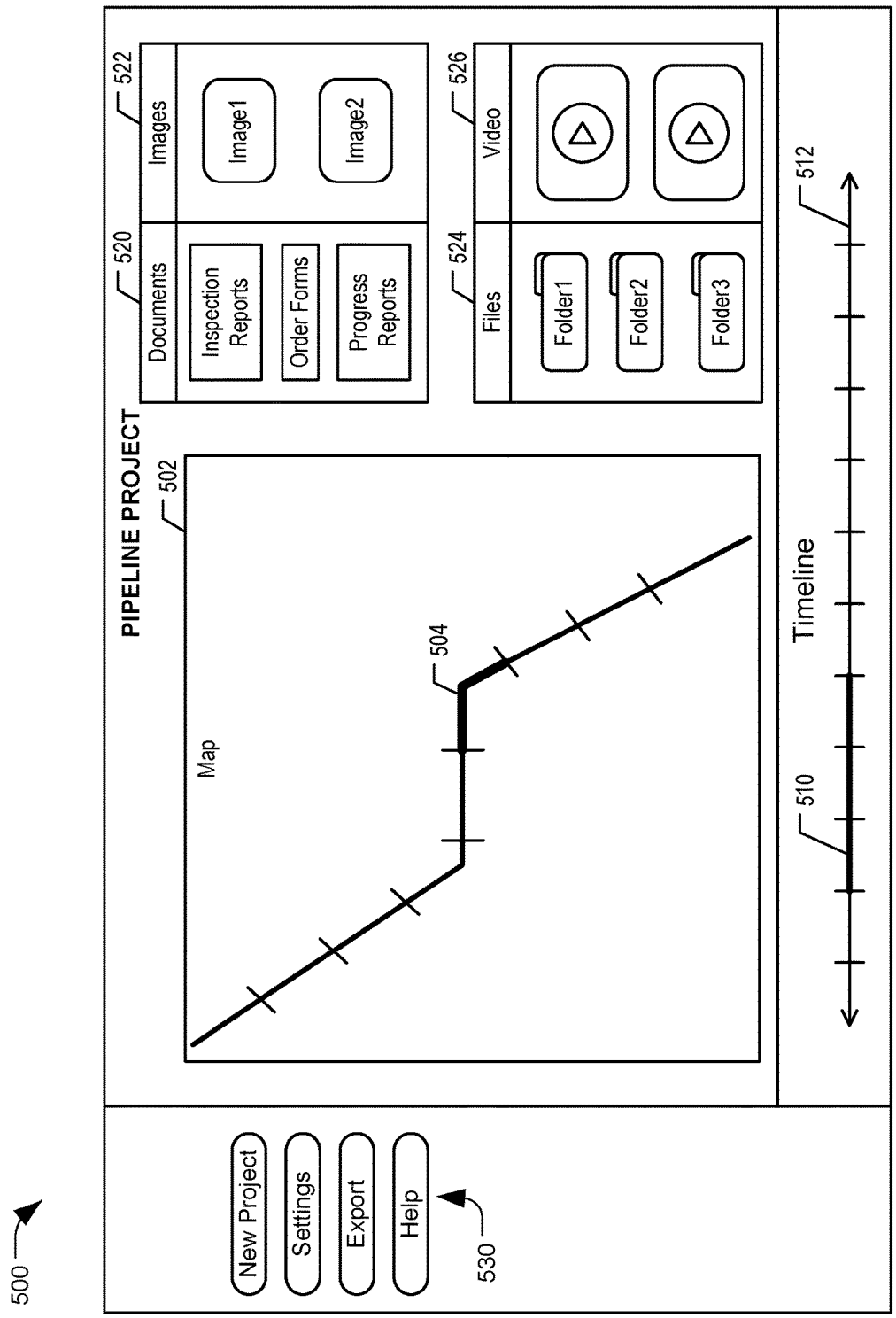
FIG. 5 is a diagram depicting a particular implementation of a project analysis GUI.

FIG. 5 depicts an illustrative implementation of a project analysis graphical user interface (GUI) 500 that enables a user to access data associated with a pipeline construction project (or other construction project) based on a location and a project timeline. The project analysis GUI 500 enables a user to select a section 504 of the pipeline on a map 502 and to select a date range 510 on a timeline 512. The project analysis GUI 500 includes a set of command buttons 530 which enable a user to choose a new project, choose settings for the project analysis GUI 500, access a "help" menu or section, and export certain aspects of the project analysis GUI 500 or export the files depicted on the project analysis GUI 500, such as documents 520 or images 522. The project analysis GUI 500 is generated based on data from the document database 140 and is displayed by the computing device 102 (or transmitted to another device for display).

The illustrative project analysis GUI 500 illustrated in FIG. 5 involves a construction project to build a pipeline displayed on the map 502. As illustrated in FIG. 5, a user has selected the section 504 of the pipeline and the date range 510 on the timeline 512. In response to receiving user input indicative of these selections, the project analysis GUI 500 displays the documents 520 corresponding with the selected section 504 of the pipeline and the date range 510. The documents 520 may include inspection reports related to the selected section 504 of the pipeline and that are dated within the selected date range 510. The documents 520 may also include order forms for parts or components installed on or used to repair the selected section 504 of the pipeline and that are dated during the selected date range 510. The documents 520 may also include progress reports related to the selected section 504 of the pipeline and that are dated during the selected date range 510. The project analysis GUI 500 may display images 522 associated with the selected section 504 of the pipeline and that have timestamps within the selected date range 510. The project analysis GUI 500 may display files 524 associated with the selected section 504 of the pipeline and that are associated with dates within the selected date range 510. The project analysis GUI 500 also may display videos 526 associated with the selected section 504 of the pipeline and that have timestamps within the selected date range 510. Display of this information (e.g., the documents 520, the images 522, the files 524, and the videos 526) may enable a user to analyze the information faster and in an easier-to-use visual format as compared to reviewing the multiple physical documents that are the source of the information. The project analysis GUI 500 may also enable a user to further filter the data being presented, as further described with reference to FIG. 6.

Figure 6:
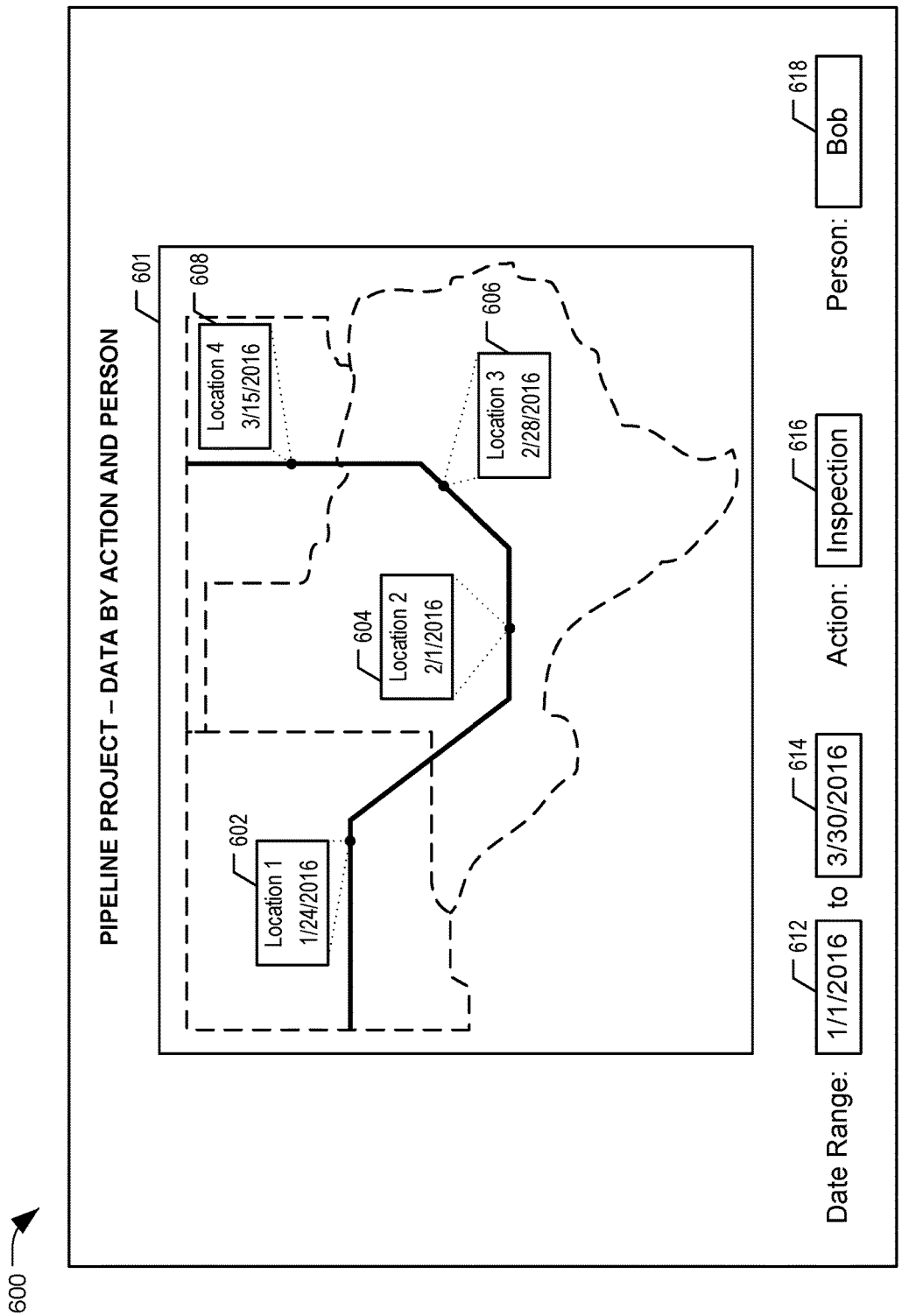
FIG. 6 is a diagram depicting a particular implementation of a second project analysis GUI that is accessible via the project analysis GUI.

FIG. 6 depicts an illustrative implementation of a geographic analysis graphical user interface (GUI) 600 that allows a user to access data associated with a pipeline construction project (or other construction project) based on a date range, an action, and a person. The geographic analysis GUI 600 includes a date range based on a start date input field 612, an end date input field 614, an action input field 616, and a person input field 618. At least a portion of the data displayed via the geographic analysis GUI 600 is based on entries in the document database 140 (e.g., structured data) that is displayed by the computing device 102 (or transmitted by the computing device 102 to another device for display).

The illustrative geographic analysis GUI 600 of FIG. 6 is based on data associated with a "Pipeline Project" in the southern United States. As illustrated in FIG. 6, a user has selected a start date of Jan. 1, 2016 using the start date input field 612, an end date of Mar. 30, 2016 using the end date input field 614, an "inspection" as the action using the action input field 616, and "Bob" as the person for using person input field 618. In response to receiving user data indicative of these selections, the geographic analysis GUI 600 displays a map view 601 of the project in which a plurality of locations 602-608 are displayed. The plurality of locations 602-608 may be sequentially numbered on a chronological basis and may include date information. In the example of FIG. 6, the map view 601 shows that "Bob" performed an "inspection" at a first location 602 ("Location 1" in the map view 601, in southeastern New Mexico) on Jan. 24, 2016 with subsequent "inspections" at a second location 604 ("Location 2" in the map view 601, in southern Texas) on Feb. 1, 2016, at a third location 606 ("Location 3" in the map view 601, in eastern Texas) on Feb. 28, 2016, and at a fourth location 608 ("Location 4" in the map view 601, in Oklahoma) on Mar. 15, 2016.

The information provided by the geographic analysis GUI 600 may enable better decision making regarding the example pipeline project of FIG. 6, as well as enabling a company associated with the pipeline project to more easily access information needed to comply with disclosure regulations.

Referring to FIG. 7, a diagram depicting a particular implementation of a template 710 associated with a scanned document 700 is shown. The scanned document 700 illustrated in FIG. 7 is an inspection report and includes multiple fields, such as a city field, a state field, multiple yes/no fields, a score field, a signature field, and a date field. In other implementations, the scanned document 700 may have a different document type and may include other information.

A template 710 may be generated based on the scanned document 700. The template may be "overlaid" on the scanned document 700 to identify locations of various information in the scanned document 700. To illustrate, the template 710 may indicate the location of a header 712 and a plurality of fields 714-728. The header 712 may include a title of the document 700, one or more graphics, or other identifying information for the document 700. The an image of the header 712 may be extracted from the scanned document 700 and compared to templates in the document template database 130 to determine the document type of the scanned document 700. Images of the responses in the fields 714-728 may be extracted and provided to data entry technicians for evaluation, and evaluation data may be used to generate structured data for storage in the document database 140, as described with reference to FIG. 1. Using the template may enable a system, such as the system 100 of FIG. 1, to quickly identify and extract responses to fields in a scanned document for use in generating structured data.

Referring to FIG. 8, a diagram illustrating an exemplary implementation of an orientation operation on a scanned document is shown. In a particular implementation, operations described with reference to FIG. 8 may be performed by the computing device 102 of FIG. 1.

The orientation operation may be selectively performed based on a determination that a scanned document 800 does not have a target orientation (e.g., a "right-side up" orientation). To determine whether the scanned document 800 has the target orientation, the computing device 102 may analyze a first portion 802 of the scanned document 800. The first portion 802 may correspond to a designated location of a header, or other identifying information, in each type of document. For example, the first portion 802 may be approximately 20% of the scanned document 800 that is closest to a particular side (e.g., a top side) of the scanned document 800. In other implementations, the first portion 802 may have a different size or location.

To analyze the first portion 802, the computing device 102 may perform text recognition on the first portion 802. The text recognition may be performed using optical character recognition (OCR) or another form of text recognition or conversion. If the computing device 102 determines that there is machine-readable text in the first portion 802 as a result of performing the text recognition, the computing device 102 determines that the scanned document 800 has the target orientation. To illustrate, the text recognition may identify characters, words, sentences, or a combination thereof, from an image of the first portion 802 of the scanned document 800. If the text recognition is able to identify characters or words, or a threshold number of characters or words, the computing device 102 may determine that the first portion 802 includes machine readable text. In a particular implementation, the computing device 102 may compare identified characters, words, or both to a dictionary, and if a number of characters or words that are within the dictionary exceeds a threshold value, the computing device 102 determines that the first portion 802 includes machine-readable text. Additionally, the text recognition operation may be able to identify text as machine-readable even if the text is skewed. A de-skewing operation may be performed subsequent to an orientation operation, as described with reference to FIG. 9.

In response to determining that the first portion 802 includes machine-readable text, the computing device 102 may determine that the scanned document 800 has the target orientation (e.g., the right-side up orientation). In response to determining that the scanned document 800 has the target orientation, the computing device 102 may determine that the scanned document 800 does not need an orientation operation, and processing of the scanned document 800 may continue, as further described herein.

If the computing device 102 determines that the first portion 802 does not include machine-readable text, the computing device 102 may perform an orientation operation. The orientation operation may include rotating a scanned document approximately 180°. Such rotation may cause a scanned document that is improperly oriented, such as in an upside down orientation, to be oriented in the target orientation (e.g., a right-side up orientation). For example, as illustrated in FIG. 8, a second scanned document 820 may be scanned in an improper orientation (e.g., upside down). The computing device 102 may perform text recognition on a first portion 822 of the second scanned document 820. Because the second scanned document 820 is upside down, the computing device 102 does not identify machine-readable text in the first portion 822 of the second scanned document 820. In response to failing to identify machine-readable text, the computing device 102 may perform an orientation operation 824 to rotate the second scanned document approximately 180°. The orientation operation 824 causes the second scanned document 820 to have the target orientation (e.g., after the orientation operation 824, the second scanned document 820 is oriented in a right-side up orientation, as illustrated with respect to the scanned document 800 in FIG. 8). After performance of the orientation operation 824 on the second scanned document 820, the computing device may perform text recognition on the first portion 822. In this example, because the second scanned document 820 is oriented in the target orientation after performance of the orientation operation 824, the computing device 102 identifies machine-readable text in the first portion 822 of the second scanned document 820.

Although a 180° orientation operation has been described, in other implementations, other orientation (e.g., rotation) operations may be performed. For example, some scanners may be capable of scanning documents in more than two orientations (e.g., substantially right-side up or substantially upside down). Thus, the computing device 102 may perform additional orientation operations until machine-readable text is identified. To illustrate, if machine-readable text is not identified in a first portion of a scanned document during performance of a first text recognition operation, the computing device 102 performs a first orientation operation by approximately 180°, and the computing device 102 performs a second text recognition operation. If the computing device 102 does not identify machine-readable text in the first portion of the scanned document during performance of the second text recognition, the computing device 102 may perform a third orientation operation to orient the scanned document approximately 90° from an original orientation. If machine-readable text is not identified after the third orientation operation, the computing device 102 may perform a fourth orientation operation to orient the scanned document approximately 270° from the original orientation. In other implementations, the orientation operations may be rotations by other amounts. Thus, in some implementations, the computing device 102 may selectively perform a plurality of orientation (e.g., rotation) operations to orient a scanned document in a target orientation.

After the computing device 102 has determined that a scanned document has the target orientation (e.g., after the computing device identifies machine-readable text in a first portion of a scanned document), the computing device 102 may determine whether fields in second portion (e.g., a footer portion) of the document have responses (e.g., whether an author has written responses to each of the fields of the document). For example, as illustrated in FIG. 8, the computing device may perform text recognition on a second portion 804 of the scanned document 800 to determine whether the scanned document is "complete" (e.g., whether one or more fields in the second portion have been filled in with responses by the author). If the computing device 102 determines that machine-readable text is identified in the second portion 804, the computing device 102 may determine that the scanned document 800 is complete. The computing device 102 may set a flag associated with the scanned document 800 to indicate that the scanned document 800 is complete, and/or the computing device 102 may perform further processing on the scanned document 800.

If the computing device 102 determines that the second portion 804 does not include machine-readable text, the computing device 102 may identify the scanned document 800 as incomplete. For example, the computing device 102 may set a flag associated with the scanned document 800 that indicates that the scanned document is incomplete, and the scanned document may be provided to an administrator for additional processing. Although the second portion 804 is illustrated in FIG. 8 as including multiple fields (e.g., a completed inspection field, a signature field, and a date field), in other implementations the second portion 804 may correspond to a single field, or one or more areas where an author is expected to fill in information in the field. For example, the second portion 804 may correspond to the signature line and/or the date line, and the computing device 102 may perform text recognition (or other image recognition techniques) to identify whether an author has written information for the signature line (and/or the date line). In some implementations, the computing device 102 may analyze the second portion 804 to determine whether the scanned document 800 is complete after the de-skewing operation described with reference to FIG. 9 and/or after the alignment operation described with reference to FIG. 10.

Thus, the orientation process described in FIG. 8 enables the computing device to orient a scanned document to a target orientation (e.g., a right-side up orientation). Orienting the scanned document in the target orientation enables the scanned document to be processed and for information, such as responses to fields, to be extracted and used to form structured data. Because the computing device 102 is able to orient the scanned documents, improperly scanned documents are not disregarded during data extraction, and the information residing within the improperly scanned documents is able to be processed.

Figure 9:
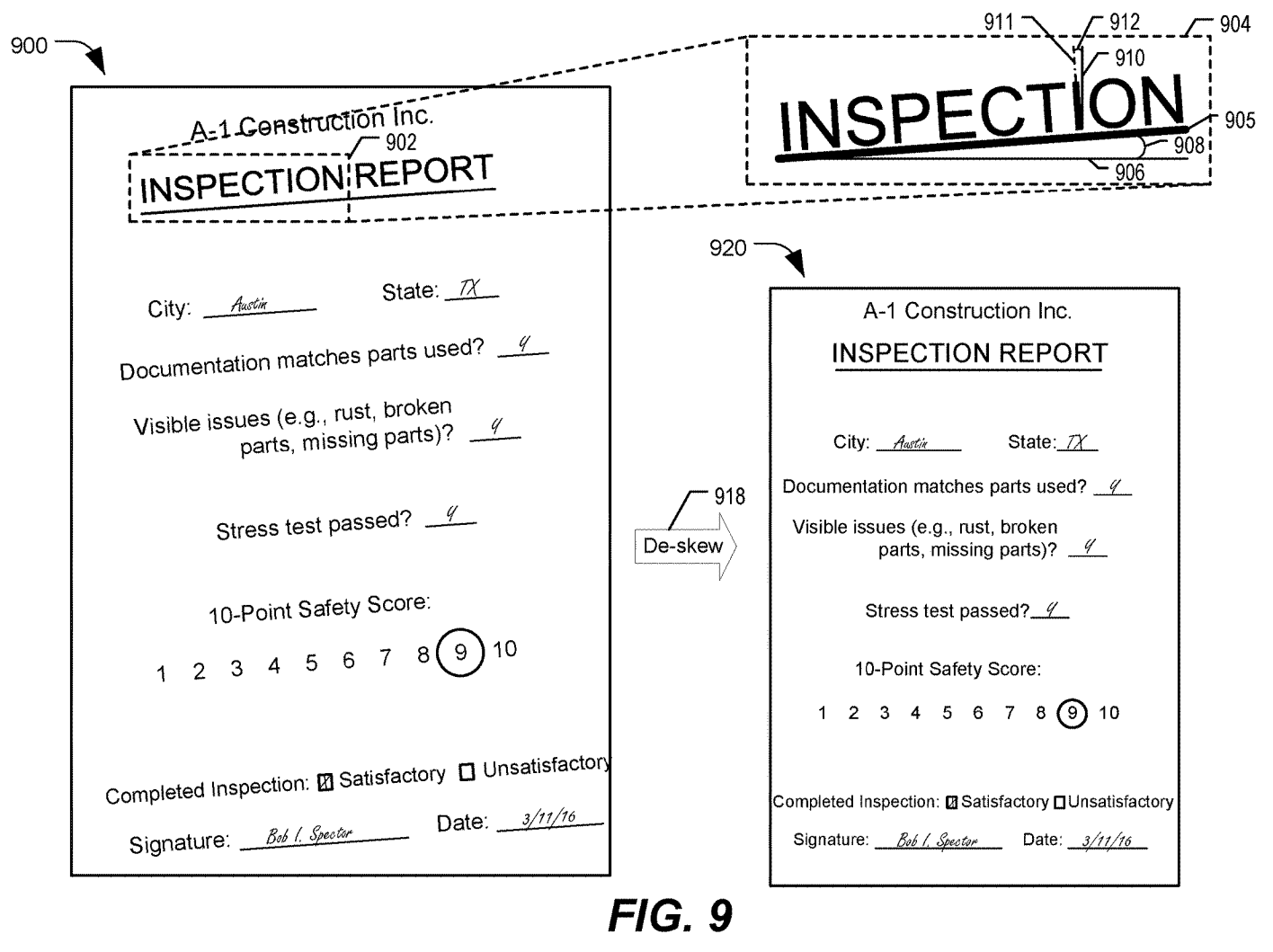

Referring to FIG. 9, a diagram illustrating an implementation of a de-skewing operation on a scanned document 900 is shown. In a particular implementation, the operations described with reference to FIG. 9 may be performed by the computing device 102 of FIG. 1. In some implementations, the de-skewing operation may be performed after the orientation operation described with reference to FIG. 8.

The de-skewing operation may be performed in response to a determination that a scanned document is skewed. To determine whether a scanned document 900 is skewed, the computing device 102 may extract an image of one or more target regions, such as a header region or other region that includes text, as indicated by a corresponding document template in the document template database 130 of FIG. 1. The computing device 102 may perform image analysis on the one or more target regions, such as a first region 902 of a scanned document 900. The first region 902 is expanded in FIG. 9 in an expanded view 904.

The computing device 102 may perform image analysis on the first region 902 to identify a plurality of lines used to form text in the first region 902. Based on a direction of lines, the computing device 102 may determine whether the scanned document 900 is skewed. To illustrate, if the scanned document 900 is not skewed, a majority of the lines that make up text (or additional features, such as underlines, graphics, etc.) in the first region 902 may be horizontal lines. Thus, to determine whether the scanned document 900 is skewed, the computing device 102 may determine whether a plurality of lines in a text region (e.g., the first region 902) are substantially horizontal.

For example, the computing device 102 may perform a Hough transform on the first region 902 to identify a plurality of lines and to determine an angle between each of the lines and a corresponding horizontal reference line. The Hough transform uses a voting procedure in a parameter space to identify instances of lines in an image of the first region 902. The lines in the first region 902 make up the text in the first region 902. Because text includes a majority of horizontal (or vertical) lines, the computing device 102 may compare the identified lines to horizontal (or vertical) references lines. To illustrate, the computing device 102 may identify a line 905 in the expanded view 904 (e.g., using a Hough transform), and the computing device 102 may compare the identified line 905 to a horizontal reference line 906 generated by the computing device 102 to determine an angle 908 between the identified line 905 and the horizontal reference line 906. The angle 908 may be representative of a skew of the scanned document 900.

Although described as a single comparison, the computing device 102 may compare a plurality of lines to horizontal reference lines. The computing device 102 may take an average, a mode, or another measurement to determine an angle that represents the skew of the scanned document 900. Additionally or alternatively, the computing device 102 may compare a line (or a plurality of lines) to a vertical reference line to determine an angle that is indicative of the skew of the scanned document 900. For example, the computing device 102 may identify a line 911, and the computing device 102 may compare the line 911 to a vertical reference line 910 generated by the computing device 102 to determine an angle 912 between the line 911 and the vertical reference line 910. The angle 912 may be indicative of the skew of the scanned document 900.

After determining the angle 908 (or the angle 912), the computing device 102 may perform a de-skewing operation 918 if the angle 908 (or the angle 912) exceeds a threshold. To illustrate, if the angle 908 (or the angle 912) fails to exceed the threshold, the scanned document 900 may be substantially de-skewed, and the de-skew operation 918 is not performed. If the angle 908 (or the angle 912) exceeds the threshold, the skew of the scanned document 900 may be such that text recognition may be degraded. Thus, the computing device 102 may perform the de-skew operation 918 to rotate the scanned document 900, resulting in a de-skewed document 920 (e.g., a rotated document). For example, if the angle 908 (or the angle 912) is 10°, the scanned document 900 may be rotated by 10°, resulting in the de-skewed document 920, as illustrated in FIG. 9. In other examples, the angle 908 (or the angle 912) may have other values, and the de-skew operation 918 may include rotating the scanned document 900 by other values to reduce or eliminate the skew.

Thus, the de-skew process described in FIG. 9 enables the computing device 102 to rotate a scanned document to reduce or eliminate skew. Once the scanned document is de-skewed, information, such as responses to fields, may be extracted from designated locations within the scanned document. Alternatively, the computing device 102 may determine whether to perform an alignment operation, as described with reference to FIG. 10. The de-skew operation and the orientation operation described with reference to FIG. 8 may represent fine and coarse adjustments, respectively, that enable a scanned document to be oriented in a manner similar to a corresponding document template. For example, the orientation operation represents a coarse adjustment to orient a scanned document in a target orientation (e.g., using an approximately 180° rotation, as a non-limiting example). The de-skew orientation represents a fine adjustment to orient the scanned document to the target orientation (e.g., using less than a 90° rotation, as a non-limiting example). Orienting the scanned document to the target orientation reduces errors in text recognition operations performed on the scanned document and increases the likelihood that responses within the scanned document are located at the same locations as in a corresponding document template.

Figure 10:
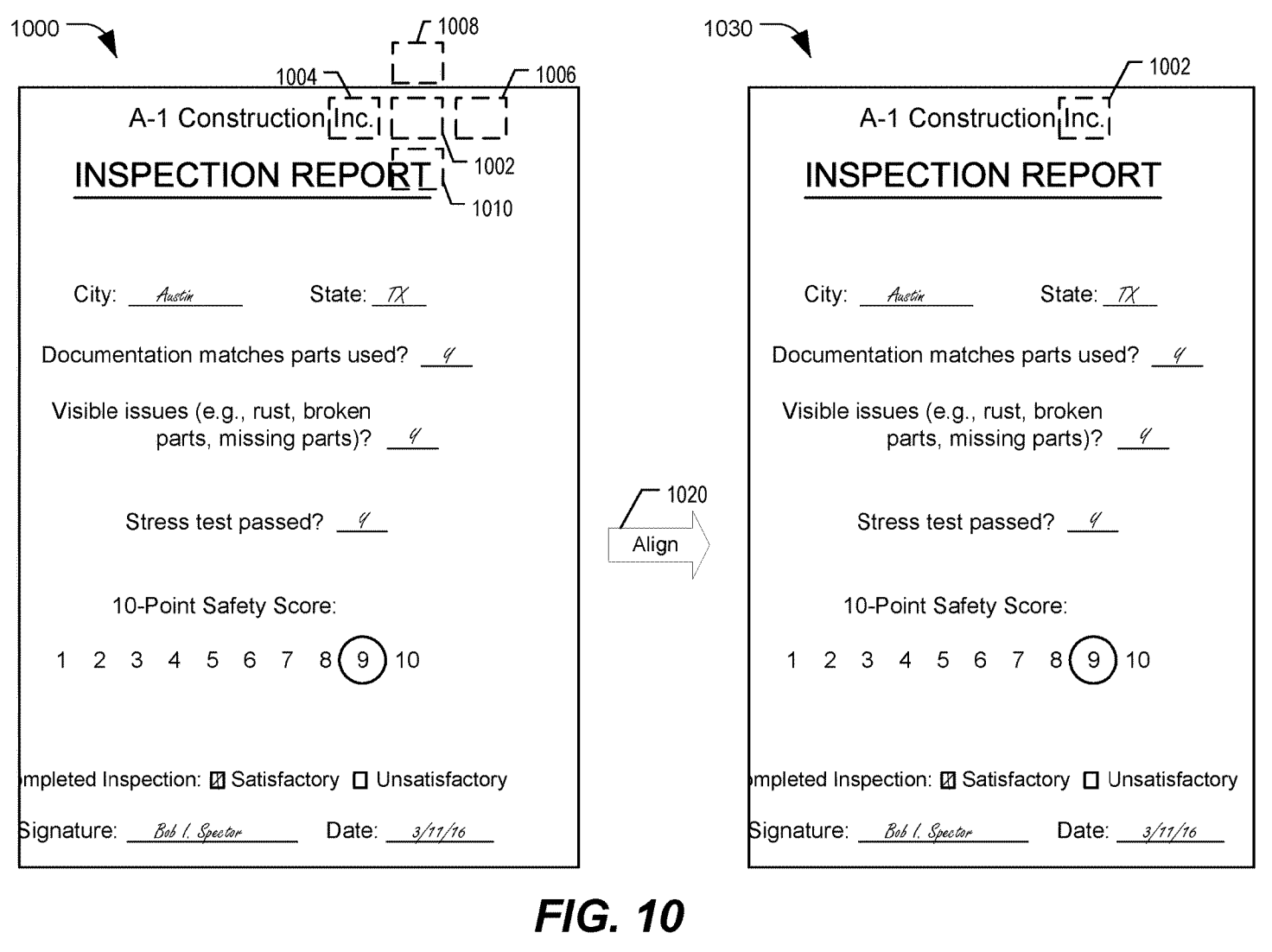

Referring to FIG. 10, a diagram illustrating an implementation of an alignment operation on a scanned document 1000 is shown. In a particular implementation, the operations described with reference to FIG. 10 may be performed by the computing device 102 of FIG. 1. In some implementations, the alignment operation may be performed after the orientation operation described with reference to FIG. 8 and the de-skewing operation described with reference to FIG. 9.

The alignment operation may be selectively performed based on a determination that one or more key words are not identified in one or more designated regions of the scanned document. To illustrate, the computing device 102 may be configured to perform text recognition in one or more designated regions of a scanned document to identify key words. Locations of the one or more regions may correspond to locations of the key words in a document template stored in the document template database 130 of FIG. 1. In some implementations, the key words may be located in a header region or a footer region of the scanned document. In other implementations, the key words may be located in other regions of the documents, such as regions that contain one or more fields or other identifying information.

To determine whether a scanned document is properly aligned (e.g., whether the scanned document has an alignment that matches a document template), the computing device 102 may determine whether a key word is identified within a first region that corresponds to the key word's location in the document template. For example, the computing device 102 may perform text recognition on a first region 1002 of a scanned document 1000 to determine whether the key word is present in the first region 1002. In the example illustrated in FIG. 10, the key word to be identified is "Inc." In other examples, the key word may be a different word or may include multiple words, and the first region 1002 may have a different location that corresponds to a location of the key word (or key words) in a corresponding document template.

If the computing device 102 identifies the key word in the first region 1002 as a result of the text recognition, the computing device 102 may identify the scanned document 1000 as having a target alignment. If the computing device 102 does not identify the key word in the first region 1002, the computing device 102 may determine that the scanned document 1000 does not have the target alignment. In response to determining that the scanned document 1000 does not have the target alignment, the computing device 102 extracts an image of a second region 1004, and the computing device 102 performs text recognition on the second region 1004 to identify whether the key word is present in the second region 1004. In a particular implementation, the second region 1004 is 20 pixels to the left of the first region 1002. If the computing device 102 identifies the key word in the second region 1004, the computing device 102 determines an alignment value that corresponds to the second region 1004 (e.g., an alignment value that aligns the scanned document 1000 20 pixels to the right).

If the computing device 102 determines that the key word is not present in the second region 1004, the computing device 102 extracts an image of a third region 1006, and the computing device 102 performs text recognition on the third region 1006 to identify whether the key word is present in the third region 1006. In a particular implementation, the third region 1006 is 20 pixels to the right of the first region 1002. If the computing device 102 identifies the key word in the third region 1006, the computing device 102 determines an alignment value that corresponds to the third region 1006 (e.g., an alignment value that aligns the scanned document 1000 20 pixels to the left).

If the computing device 102 determines that the key word is not present in the third region 1006, the computing device 102 extracts an image of a fourth region 1008, and the computing device 102 performs text recognition on the fourth region 1008 to identify whether the key word is present in the fourth region 1008. In a particular implementation, the fourth region 1008 is 20 pixels above the first region 1002. If the computing device 102 identifies the key word in the fourth region 1008, the computing device 102 determines an alignment value that corresponds to the fourth region 1008 (e.g., an alignment value that aligns the scanned document 1000 20 pixels down).

If the computing device 102 determines that the key word is not present in the fourth region 1008, the computing device 102 extracts an image of a fifth region 1010, and the computing device 102 performs text recognition on the fifth region 1010 to identify whether the key word is present in the fifth region 1010. In a particular implementation, the fifth region 1010 is 20 pixels below the first region 1002. If the computing device 102 identifies the key word in the fifth region 1010, the computing device 102 determines an alignment value that corresponds to the fifth region 1010 (e.g., an alignment value that aligns the scanned document 1000 20 pixels up).

Although four additional regions (e.g., regions 1004-1010) are described, in other implementations, the computing device 102 may perform text recognition on more than four or fewer than four additional regions after determining that the key word is not present in the first region 1002. Additionally or alternatively, the regions 1002-1010 may have different locations than described above. Additionally, although described herein as one key word identification, the computing device 102 may perform multiple key word identifications in order to determine whether the scanned document 1000 has the target alignment. For example, the computing device 102 may perform text recognition on a group of regions to identify a group of key words. In response to determining that the group of key words is not present in the group of regions, the computing device may perform text recognition on other groups of regions, in a similar manner to the regions 1004-1010.

If the computing device 102 determines an alignment value associated with identification of the key word (or key words), the computing device 102 performs an alignment operation 1020 on the scanned document 1000, resulting in an aligned scanned document 1030. The alignment operation 1020 is based on the alignment value determined by the computing device 102. To illustrate, in the example illustrated in FIG. 10, the computing device may identify the key word "Inc." in the second region 1004. Based on the identification of the key word, the computing device determines that the scanned document 1000 is aligned 20 pixels to the left of the target alignment. For example, the scanned document 1000 may be cropped to remove the right-most 20 pixels, or another type of alignment operation may be performed. Thus, the computing device 102 may perform the alignment operation 1020 to align the scanned document 1000 20 pixels to the right, resulting in the aligned scanned document 1030 as illustrated in FIG. 10.

Thus, the alignment process described in FIG. 10 enables the computing device 102 to align a scanned document to a target alignment (e.g., an alignment that corresponds to a document template). Once the scanned document is aligned, information, such as responses to fields, may be extracted from designated locations within the scanned document. The designated locations correspond to locations of the fields in the document template. Extracting information from the designated locations of an unaligned scanned document may result in extracting incorrect information (e.g., the extracted information may be cut off or may include information from a different field). Aligning the scanned document increases the likelihood that the extracted responses are complete and do not contain information from other fields, which improves the processing of the information to generate structured data.

Figure 11:
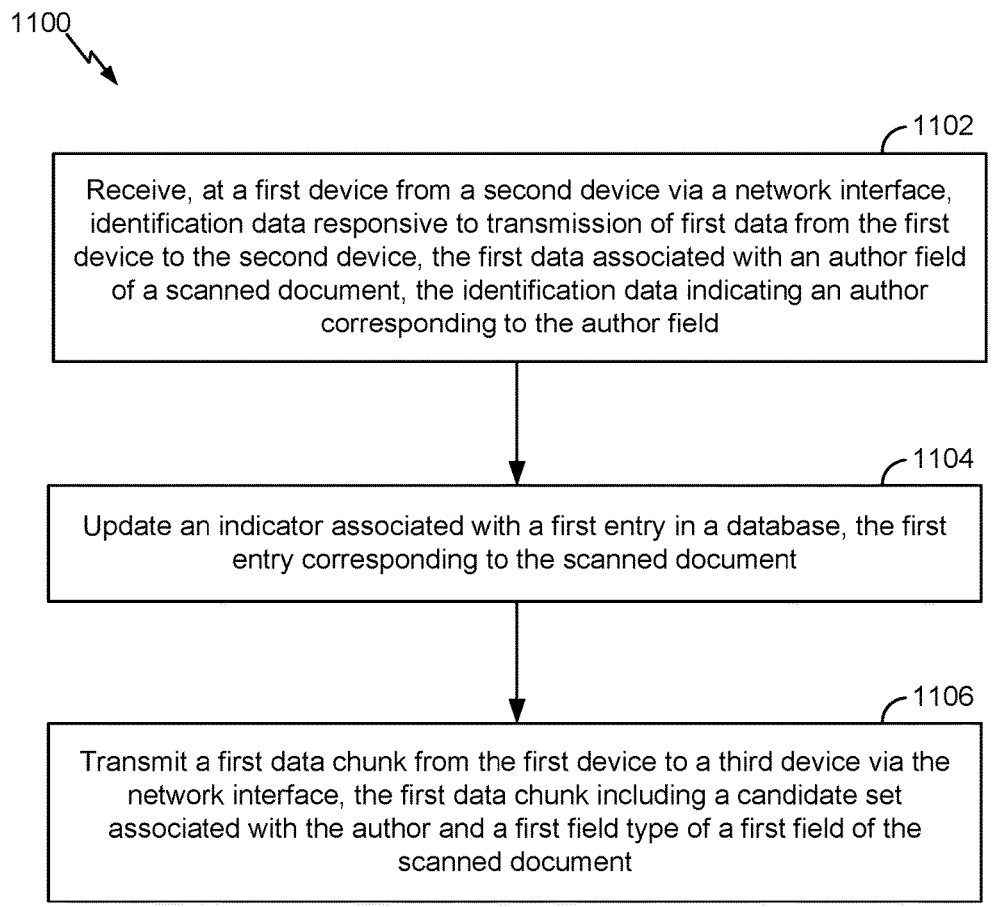
FIG. 11 is a flowchart illustrating a particular implementation of a method of analyzing scanned documents that includes transmitting data chunks to different devices based on author information.

FIG. 11 is a flow diagram illustrating a particular implementation of a method 1100 of analyzing scanned documents that includes transmitting data chunks to different devices based on author information. In a particular implementation, the method 1100 may be performed by the computing device 102 of FIG. 1. The method 1100 includes, at 1102, receiving, at a first device from a second device via a network interface, identification data responsive to transmission of first data from the first device to the second device. The first data may be associated with an author field of a scanned document, and the identification data may indicate an author corresponding to the author field. For example, the first device may correspond to the computing device 102 of FIG. 1, the second device may correspond to the second device 106 of FIG. 1, and the network interface may correspond to the network interface 118 of FIG. 1. The identification data responsive to transmission of first data from the first device to the second device may correspond to the author identification 162 of FIG. 1 and the first data may correspond to the author field data 160 of FIG. 1. As described with reference to FIG. 1, the computing device 102 may receive the author identification 162 via the network interface 118 from the second device 106 responsive to transmission of the author field data 160 from the computing device 102 to the second device 106.

The method 1100 includes, at 1104, updating an indicator associated with a first entry in a database, the first entry corresponding to the scanned document. The first entry may correspond to the first entry 142 of the document database 140 of FIG. 1 and the indicator may correspond to the author indicator 148 of FIG. 1. The scanned document may correspond to a physical document scanned by the scanner 104 attached to the computing device 102 of FIG. 1 and represented by the scanned document data 122. In a particular implementation, the indicator is an author indicator, and the author indicator is updated based on the author. For example, the computing device 102 may receive the author identification 162 and may update the author indicator 148 of the first entry 142 in the document database 140 based on the author indicated by the author identification 162.

The method 1100 includes, at 1106, transmitting a first data chunk from the first device to a third device via the network interface. The first data chunk may include a candidate set associated with a first field of the scanned document based on the author and a first field type. The first data chunk may correspond to the first data chunk 164 of FIG. 1, the third device may correspond to the third device 108 of FIG. 1, and the candidate set may correspond to the first candidate set 124 of FIG. 1. As described with reference to FIG. 1, the computing device 102 may transmit the first data chunk 164 to the third device 108 via the network interface 118, and the first data chunk 164 may include the first candidate set 124. The first data chunk may also include a set of expected responses, as described with reference to FIGS. 1 and 2.

In a particular implementation, the method 1100 further includes accessing a profile database based on the author to retrieve the candidate set. The candidate set may include one or more candidate responses associated with the first field. For example, the profile database may include the profile database 152 of FIG. 1, which is accessed by the computing device 102. The method 1100 may also include identifying a first profile based on the author and retrieving the candidate set from the first profile. The first profile may indicate one or more candidate sets corresponding to one or more fields of one or more scanned documents. The first profile may correspond to the first profile 154 of FIG. 1, and the one or more candidate sets may correspond to the candidate set(s) 123 of FIG. 1. To illustrate, the computing device 102 may access the profile database 152 to retrieve the first profile 154 that includes the candidate set(s) 123 (including at least one of the first candidate set 124, the second candidate set 126, and the Nth candidate set 128).

In another particular implementation, the first data chunk may further include first field data indicating one or more entries in one or more fields of at least the scanned document, the one or more fields corresponding to the author and the first field type. For example, the first data chunk 164 of FIG. 1 may include responses to a particular field extracted from one or more scanned documents (e.g., the scanned document data 122) associated with a particular author. As a particular example, the first field data may include the extracted responses illustrated in FIG. 2. The method 1100 may include receiving evaluation data from the third device at the first device via the network interface. The evaluation data may indicate one or more evaluated entries associated with the one or more fields based on the first data chunk. The evaluation data may correspond to the first evaluation data 166 of FIG. 1, which is received by the computing device 102.

The method 1100 may further include initiating display of a graphical user interface (GUI) based on the evaluation data. The GUI may enable a time-varying overview of a construction project. The GUI may correspond to the project analysis GUI 500 of FIG. 5. To illustrate, the computing device 102 may update the entries in the document database 140 based on evaluation data (e.g., the first evaluation data 166, the second evaluation data 170, and the Nth evaluation data 174). The computing device 102 may initiate display of the project analysis GUI 500 based on the entries in the document database 140 (e.g., based on structured data). The project analysis GUI 500 displays information related to a construction project. The method 1100 may further include adjusting at least one display element of the GUI based on input data that indicates a selected time range. For example, a user may select the date range 510 via the timeline 512 in the project analysis GUI 500, and the project analysis GUI 500 may display information (e.g., the documents 520, the images 522, the files 524, and the videos 526) based on the date range 510.

In another particular implementation, the method 1100 includes transmitting a second data chunk from the first device to a fourth device via the network interface. The second data chunk may include second field data and a second candidate set associated with a second field of the scanned document. The second field data may indicate one or more entries in one or more fields of at least the scanned document, the one or more fields corresponding to the author and a second field type. The second data chunk may correspond to the second data chunk 168 of FIG. 1, the second candidate set may correspond to the second candidate set 126 of FIG. 1, and the second field data may correspond to extracted responses to a second field from one or more scanned documents that are associated with the author. As a particular example, the second field data may include extracted responses as illustrated in FIG. 2.

In another particular implementation, the method 1100 includes receiving document data from a scanner via an input/output (I/O) interface at the first device, processing a portion of the document data to identify a document type corresponding to the scanned document, and storing the first entry in the database. The document data may correspond to the scanned document and the first entry may include an identifier associated with the scanned document and the document type. The document data may correspond to the scanned document data 122 of FIG. 1 and the I/O interface may correspond to the I/O interface 119 of FIG. 1, which is configured to receive the document data 122 from the scanner 104. The first entry may correspond to the first entry 142 of FIG. 1. The computing device 102 may identify a document type of a first scanned document, and the computing device 102 may generate and store the first entry 142 (including the identifier 144) in the document database 140.

The method 1100 may further include access a document template database based on the document type to identify a first template that corresponds to the document type and extracting entry data from regions within the scanned document corresponding to locations of one or more fields in the first template. The entry data may include the first data associated with the author field. To illustrate, the document template database may correspond to the document template database 130 of FIG. 1 and the first template may correspond to the first template 132 of FIG. 1. The computing device 102 may determine that the first template 132 and the scanned document have a same document type, and the computing device 102 may extract the author field data 160 from a location in the scanned document corresponds to a location of an author field in the first template 132.

The method 1100 of FIG. 11 may provide extracted responses (e.g., field data) to different data entry technicians for evaluation. Because the field data is provided based on field types associated with the extracted responses, security of the evaluation is improved because each data entry technician receives information related to one field (or a few fields) instead of an entire document. Efficiency of the evaluation is improved because the data entry technician matches an extracted response to a candidate set (or a set of expected responses), which is more efficient and less error prone than manually entering a value for the extracted response. Additionally, the method 1100 may enable receipt of evaluation data, which can be used to generate structured data (e.g., entries in a document database) that can be used to generate reports or GUIs. The reports or GUIs may enable a user to quickly and efficiently learn information related to a construction project without reading multiple physical documents.

Figure 12:
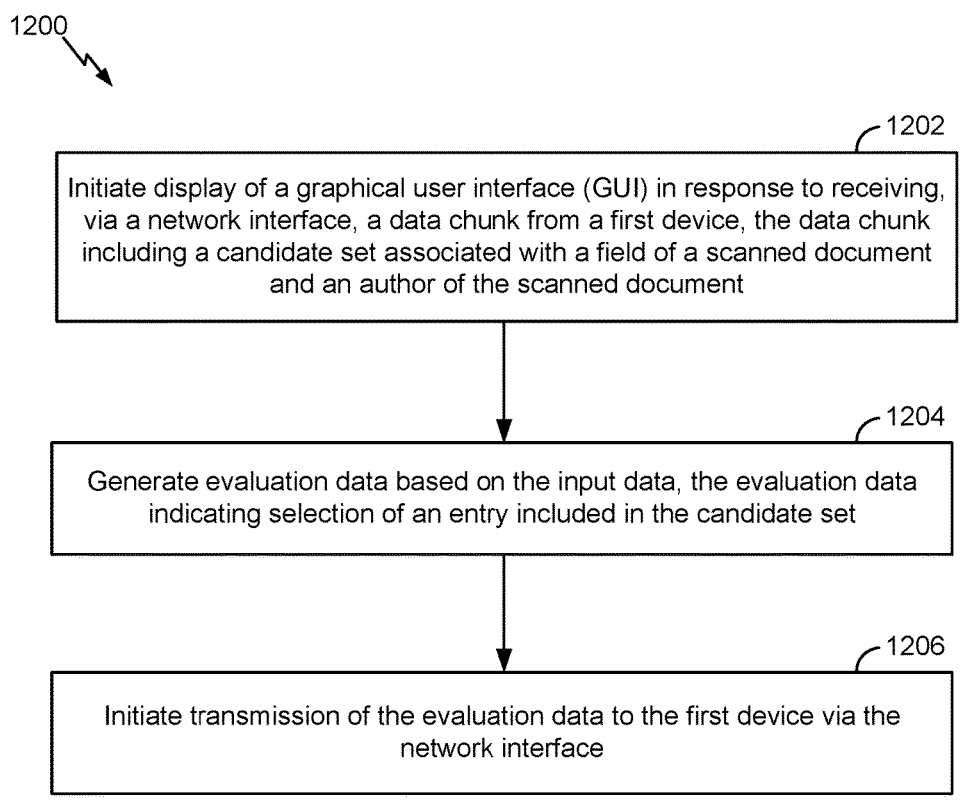
FIG. 12 is a flowchart illustrating a particular implementation of a method of generating evaluation data based on selection of an entry in a candidate set displayed via a GUI.

FIG. 12 is a flow diagram illustrating a particular implementation of a method 1200 of generating evaluation data based on selection of an entry in a candidate set displayed via a GUI. In a particular implementation, the method 1200 may be performed by the third device 108, the fourth device 110, or the Nth device 112 of FIGS. 1-2. The method 1200 includes, at 1202, initiating display of a graphical user interface (GUI) in response to receiving, via a network interface, a data chunk from a first device. The data chunk may include a candidate set associated with a field of a scanned document and an author of the scanned document. The GUI may correspond to the GUI 400 of FIG. 4, the network interface may correspond to the network interface 252 of FIG. 2, the data chunk may correspond to the first data chunk 164 of FIGS. 1-2, the first device may correspond to the computing device 102 of FIG. 1, and the candidate set may correspond to the first candidate set 124 of FIGS. 1-2. For example, the third device 108 may initiate display of the GUI 400 in response to receiving the first data chunk 164 from the computing device 102.

The method 1200 includes, at 1204, generating evaluation data based on the input data. The evaluation data may indicate selection of an entry included in the candidate set. The evaluation data may correspond to the first evaluation data 166 of FIG. 1. For example, the third device 108 may display the GUI 400 and receive a user input from a data entry technician responsive to display of the GUI 400.

The method 1200 includes, at 1206, initiating transmission of the evaluation data to the first device via the network interface. For example, the third device 108 may initiate transmission of the first evaluation data 166 to the computing device 102 via the network interface 252.

In a particular implementation, the GUI includes the candidate set and a selectable indicator, and the candidate set includes one or more handwritten entries associated with the field of the scanned document and the author. To illustrate, the selectable indicator may correspond to the selectable indicator 406 of FIG. 4, and a data entry technician may select the selectable indicator 406 that corresponds to one of the group of entries 404 (of the first candidate set 124) that most closely matches the current entry 402. The selectable indicator may enable selection of one or more handwritten entries (e.g., the group of entries 404 of FIG. 4) or a configurable entry (e.g., the configurable entry 407 of FIG. 4). The GUI may also include an adjustable likelihood score (e.g., the adjustable score indicator 408 of FIG. 4) corresponding to a likelihood that the entry for evaluation is associated with the author.

The method 1200 of FIG. 12 may enable a data entry technician to evaluate responses extracted from multiple scanned documents. Because the data entry technician receives extracted responses, sets of expected responses, and candidate sets, efficiency of the evaluation is improved as compared manually entering values for the extracted responses.

Figure 13:
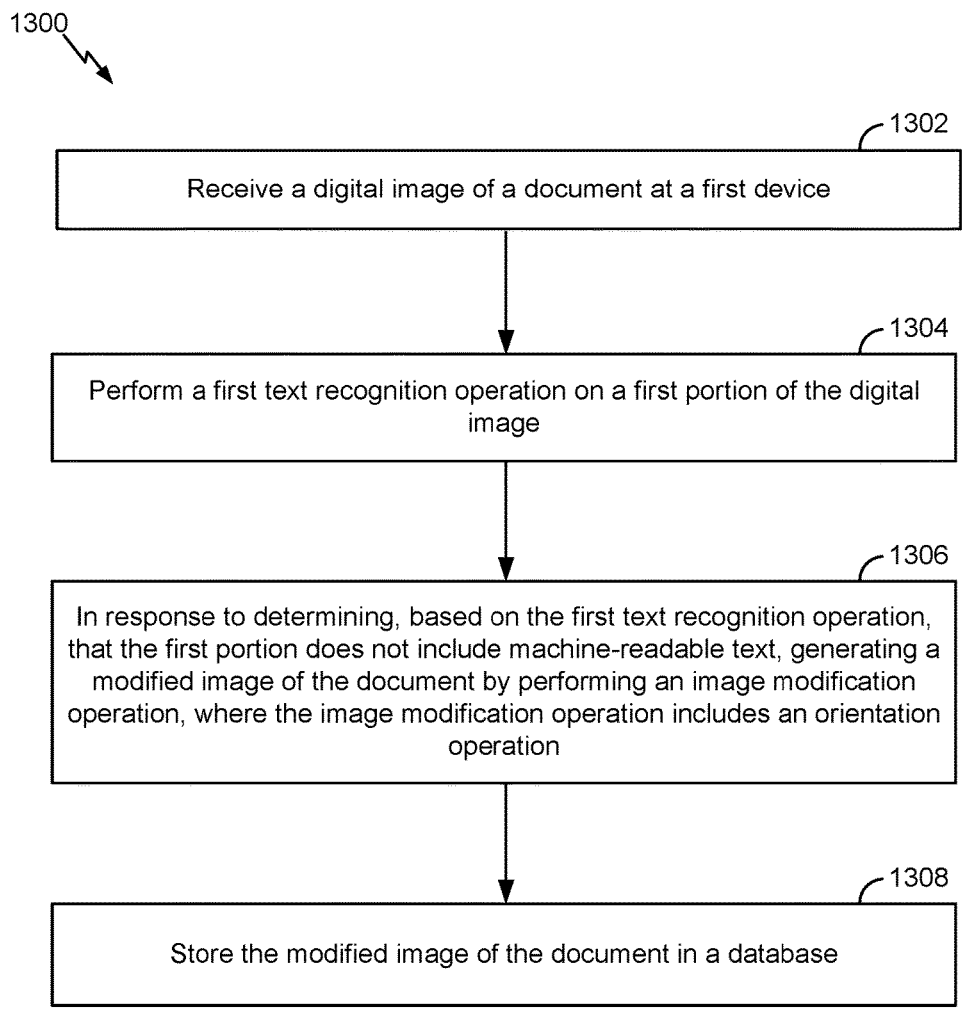
FIG. 13 is a flowchart illustrating a particular implementation of a method of performing an image modification operation on a digital image of a document based on a text recognition operation.

FIG. 13 is a flow diagram illustrating an exemplary implementation of a method 1300 of performing an image modification operation on a digital image of a document based on a text recognition operation. In a particular implementation, the method 1300 may be performed by the computing device 102 of FIG. 1. The method 1300 includes receiving a digital image of a document at a first device, at 1302. For example, with reference to FIG. 1, the computing device 102 may receive the scanned document data 122 (e.g., one or more digital images of scanned documents). In a particular implementation, the digital image may be received from a scanner coupled to an input interface of the first device or from another device via a network interface. For example, the computing device 102 may receive the scanned document data 122 from the scanner 104 via the I/O interface 119. As another example, the computing device 102 may receive the scanned document data 122 from another device (or may access the scanned document data 122 that is stored at another device) via the network interface 118.

The method 1300 includes performing a first text recognition operation on a first portion of the digital image, at 1304. For example, the first text recognition operation may be performed on the first portion 802 of the scanned document 800 (e.g., a digital image of a scanned document). A location of the first portion 802 may correspond to a location of a text region in a document template, such as a document template stored in the document template database 130 of FIG. 1.

The method 1300 includes, in response to determining, based on the first text recognition operation, that the first portion does not include machine-readable text, generating a modified image of the document by performing an image modification operation, at 1306. For example, in response to determining that the first portion 822 of the second scanned document 820 does not include machine-readable text, the orientation operation 824 may be performed on the second scanned document 820. The image modification operation may include an orientation operation. For example, the orientation operation may include rotating the digital image of the document by a particular amount. In a particular implementation, the particular amount is 180 degrees. For example, the orientation operation 824 may include rotating a digital image of the second scanned document 820 by approximately 180 degrees, such that the second scanned document has a target orientation (e.g., a right-side up orientation) after the orientation operation 824, as described with reference to FIG. 8. The image modification operation may also include a de-skewing operation, an alignment operation, or both, as further described with reference to FIGS. 9-10.

The method 1300 further includes storing the modified image of the document in a database, at 1308. For example, after performance of the orientation operation 824, a modified image of the second scanned document 820 may be stored in a database, such as the document database 140 of FIG. 1.

In a particular implementation, the method 1300 further includes, prior to storing the modified image in the database, performing a second text recognition operation on a first portion of the modified image and determining, based on the second text recognition operation, that the first portion of the modified image includes machine-readable text. For example, after performing the orientation operation 824 on the second scanned document 820, a second text recognition operation may be performed on the first portion 822 of the second scanned document 820. Due to the orientation operation 824, the second scanned document 820 has a right-side up orientation, such that the second text recognition operation identifies machine-readable text.

In another particular implementation, the method 1300 further includes, after performing the orientation operation, determining whether the modified image is skewed. Determining whether the modified image is skewed may include identifying one or more lines in a second region of the modified image, comparing the one or more lines to one or more reference lines to determine an angle, and determining that the modified image is skewed based on a determination that the angle exceeds a threshold. For example, with reference to FIG. 9, one or more lines in the first region 902 of the scanned document 900 may be identified, and the one or more lines, such as lines 905 and 911, may be compared to one or more reference lines, such as reference lines 906 and 910, to determine one or more angles, such as angles 908 and 912. If the angle 908 (and/or the angle 912) exceeds a threshold, the scanned document 900 is determined to be skewed. In a particular implementation, the one or more lines (e.g., the lines 905 and 911) may be identified based on a Hough transformation on text within the first region 902.

The method 1300 may also include performing a de-skewing operation on the modified image in response to determining that the modified image is skewed. The de-skewing operation may be performed prior to storing the modified image in the database. For example, with reference to FIG. 9, the de-skewing operation 918 (e.g., a rotation operation) may be performed to reduce or eliminate the skew of the scanned document 900. The de-skewing operation may include a rotation operation based on the angle. For example, with reference to FIG. 9, the de-skewing operation 918 may be based on the angle 908 (or the angle 912). In some implementations, the de-skewing operation 918 represents a fine rotation (e.g., a rotation by less than 45 degrees, as a non-limiting example), as compared to the orientation operation 824 of FIG. 8, which represents a coarse rotation operation (e.g., a rotation by 180 degrees or by 90 degrees, as non-limiting examples).

In another particular implementation, the method 1300 further includes performing an alignment operation on the modified image. The alignment operation may be performed prior to storing the modified image in the database. To illustrate, with reference to FIG. 10, the alignment operation 1020 may be performed on the scanned document 1000 (e.g., a digital image of a document) to generate the aligned document 1030. The alignment operation may be performed in response to a determination that a third portion of the modified image does not contain one or more key words.

The method 1300 may further include determining a region of the modified image that contains the one or more key words and determining an alignment value based on a difference in position between the third portion and the region. The alignment operation may be performed based on the alignment value. To illustrate, with reference to FIG. 10, a text recognition operation may be performed on the first region 1002 of the scanned document 1000 (e.g., a digital image of a scanned document). If one or more key words are not identified as being located within in the first region 1002, another text recognition operation may be performed on the second region 1004. If one or more key words are identified as being located within the second region 1004, an alignment value may be determined based on a difference in locations between the first region 1002 and the second region 1004, and the alignment operation 1020 may be performed based on the alignment value. If one or more key words are not identified as being located within the second region 1004, additional regions (e.g., regions 1006-1010 or other regions) may be analyzed to look for the one or key words. If the one or more key words are identified as being located within a region, an alignment value may be determined and the alignment operation 1020 may be performed. If the one or more key words are not identified, an error may be generated.

In another particular implementation, the method 1300 includes accessing the modified image from the database, extracting first data from an author field of the modified image, transmitting the first data from the first device to a second device via a network interface, and receiving identification data responsive to transmission of the first data from the first device to the second device. The identification data may indicate an author corresponding to the author field. To illustrate, the computing device 102 may access the first entry 142 from the document database 140 to extract the author field data 160. The computing device 102 may transmit the author field data 160 to the second device 106 and, responsive to the transmission, receive the author identification 162, which indicates an author of a scanned document represented by the first entry 142. One or more expected responses, a candidate set, or both may be transmitted in addition to the author field data 160. In other implementations, the computing device 102 may store the author field data 160 in a database (or other storage location that is accessible to the second device 106), and responsive to the storage, the computing device 102 may receive the author identification 162.

In some implementations, the method 1300 may further includes retrieving, based on the identification data, a candidate set associated with an author from a profile database and transmitting a data chunk from the first device to a third device via the network interface. The data chunk includes an extracted response from a field of the modified image, one or more expected responses associated with the field, and the candidate set. To illustrate, the computing device 102 may retrieve the first candidate set 124 from the first profile 154 in the profile database 152. The computing device 102 may transmit extracted field data, one or more expected responses (e.g., the expected responses 133), and the first candidate set 124 to the third device 108 as the first data chunk 164, as described with reference to FIG. 1.

In another particular implementation, the first device may be a server and may include an input interface configured to receive the digital image of the document, a processor, and a memory coupled to the processor. The memory may store instructions that, when executed by the processor, causes the processor to perform the operations described with reference to FIG. 13. For example, the server may correspond to the computing device 102 of FIG. 1 that includes the I/O interface 119, the memory 115 (storing instructions 117), and the processor 120. The memory may be configured to store a document template database (e.g., the document template database 130 of FIG. 1), and a location of the first portion within the digital image may correspond to a location of a text region within a document template in the document template database. Additionally or alternatively, the modification operation may further include a de-skewing operation, an alignment operation, or both (e.g., in addition to the orientation operation). Additionally or alternatively, the server may further include a network interface (e.g., the network interface 118 of FIG. 1) that is configured to transmit first data extracted from an author field of the modified image to a second device. The network interface may be further configured to receive identification data responsive to transmission of the first data, the identification data indicating an author corresponding to an author field.

The method 1300 of FIG. 13 may enable a digital image of scanned document to be properly oriented such that an orientation of the image matches an orientation of a document template. Because the orientation of the scanned document matches the orientation of the document template, locations of fields in the document template match locations of fields in the scanned document. Thus, the method 1300 enables a scanned document to be re-oriented (if needed) to enable extraction of responses for use in generating structured data. The orientation and other operations described with reference to FIG. 13 reduce (or eliminate) a number of scanned documents that are unable to be processed (e.g., due to improper orientation, skew, or improper alignment). Increasing the number of scanned documents that are processed improves the reports and GUIs that are generated using structured data based on extracted responses from the scanned documents.

FIG. 14 is a flow diagram illustrating an exemplary implementation of a method 1400 of modifying a digital image of a document. In a particular implementation, the method 1400 may be performed by the computing device 102 of FIG. 1. The method 1400 includes, at 1402, receiving a digital image of a document at a first device. For example, the computing device 102 may receive the scanned document data 122 (e.g., a digital image of a document) from the scanner 104 via the I/O interface 119.

The method 1400 includes, at 1404, performing a first text recognition operation on a first portion of the digital image. For example, a first text recognition operation may be performed on the first portion 802 of the scanned document 800. In a particular implementation, a location of the first portion within the digital image corresponds to a location of a text region within a document template. For example, the first text region may be a header region or other text region that includes identifying information within a document template.

The method 1400 includes, at 1406, determining whether the first portion includes machine readable text. If the first portion includes machine-readable text, the method 1400 continues to 1410. If the first portion does not include machine-readable text (e.g., if the image is not oriented in a right-side up orientation), the method 1400 continues to 1408, where an oriented image of the document is generated by performing an orientation operation on the digital image. For example, the digital image may be rotated by 180 degrees (or another amount), as further described with reference to FIG. 8. The method 1400 continues to 1410.

The method 1400 includes, at 1410, identifying one or more lines within a second portion of the oriented image. For example, one or more lines may be identified by performing a Hough transform on a region that is expected to contain text. The method 1400 includes, at 1412, determining whether one or more angles between the one or more lines and one or more reference lines exceeds a threshold. For example, one or more lines included in text may be compared to one or more reference lines to determine angles, as further described with reference to FIG. 9. If the one or more angles fail to exceed the threshold, the method 1400 continues to 1416. If the one or more angles exceeds the threshold (e.g., if the oriented image is skewed), the method continues to 1414, where a de-skewed image of the document is generated by performing a de-skewing operation on the oriented image. For example, a de-skewing operation (e.g., a rotation operation based on the one or more angles) may be performed, as described with reference to FIG. 9. The method 1400 continues to 1416.

The method 1400 includes, at 1416, determining whether one or more key words are located within a third portion of the digital image. If the one or more key words are identified as being located within the third portion, the de-skewed image is properly aligned, and the method 1400 continues to 1420, where the modified (e.g., the de-skewed) image is stored in a document database. If the one or more key words are not identified as being located within the third portion, the method 1400 continues to 1418, where a modified image of the document is generated by performing an alignment operation on the de-skewed image. For example, the image may be aligned by a particular amount (e.g., 20 pixels, as a non-limiting direction) in a particular direction, as further described with reference to FIG. 10. The method 1400 may return to 1416 to determine whether the alignment operation is successful (e.g., whether the one or more key words are now identified). If the one or more key words are identified, the modified image is stored, at 1420. If the one or more key words are not identified, another alignment operation is performed, and the method 1400 returns to 1416. In some implementations, if a count of alignment operations exceeds a threshold (e.g., a total number of alignment operations), the method 1400 may include generating an error instead of returning to 1416.

In a particular implementation, the method 1400 includes extracting field data from a field of the modified image, where the field is associated with one or more expected responses. The method 1400 also includes transmitting a data chunk from the first device to a second device, where the data chunk includes the field data and the one or more expected responses. The method 1400 further includes receiving, responsive to transmitting the data chunk, evaluation data from the second device at the first device. Thus, after performing an orientation operation, a de-skewing operation, an alignment operation, or a combination thereof, on a digital image of a scanned document, one or more responses may be extracted from the digital image and provided, as a data chunk, to another device for use in generating evaluation data. The evaluation data may be used to generate structured data indicative of responses to fields of the scanned document, as further described with reference to FIG. 1.

The method 1400 of FIG. 14 may reduce a number of scanned documents that would otherwise be unable to be processed to generate structured data by orientating, de-skewing, and aligning the scanned documents as needed. Increasing the number of scanned documents that are processed (e.g., reducing the number of scanned documents that are not processed) improves the reports and GUIs that are generated using structured data based on extracted responses from the scanned documents.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be combined with other method operations or may be omitted. As an example, one or more operations described with reference to FIGS. 11-14 may be optional, may be performed at least partially concurrently, and/or may be performed in a different order than shown or described. Additionally or alternatively, one or more operations described with reference to FIGS. 11-14 may be performed as part of another method described with reference to FIGS. 11-14. Accordingly, the disclosure and the figures are to be regarded as illustrative rather than restrictive.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   receiving, at a first device from a second device via a network interface, identification data responsive to transmission of first data from the first device to the second device, the first data associated with an author field of a scanned document, the identification data indicating an author corresponding to the author field;
   updating an indicator associated with a first entry in a database, the first entry corresponding to the scanned document; and
   transmitting a first data chunk from the first device to a third device via the network interface, the first data chunk including a candidate set associated with the author and a first field type of a first field of the scanned document, wherein the third device is selected from a plurality of devices based on the first field type.

2. The method of claim 1, further comprising accessing a profile database based on the author to retrieve the candidate set, wherein the candidate set includes one or more candidate responses associated with the first field.

3. The method of claim 2, further comprising:
   identifying a first profile based on the author, the first profile indicating one or more candidate sets corresponding to one or more fields of one or more scanned documents; and
   retrieving the candidate set from the first profile.

4. The method of claim 1, further comprising selecting the third device from the plurality of devices based on the first field type, wherein the first field type comprises a yes/no field, a checkbox field, an address field, an author field, a date field, a score field, cost field, requested item field, or an evaluation field.

5. The method of claim 1, wherein the first data chunk further includes first field data indicating one or more entries in one or more fields of at least the scanned document, the one or more fields corresponding to the author and the first field type.

6. The method of claim 5, further comprising receiving evaluation data from the third device at the first device via the network interface, the evaluation data indicating one or more evaluated entries associated with the one or more fields based on the first data chunk.

7. The method of claim 6, further comprising initiating display of a graphical user interface (GUI) based on the evaluation data, wherein the GUI enables a time-varying overview of a construction project.

8. The method of claim 7, further comprising adjusting at least one display element of the GUI based on input data that indicates a selected time range.

9. The method of claim 1, further comprising transmitting a second data chunk from the first device to a fourth device via the network interface, the second data chunk including second field data and a second candidate set associated with a second field of the scanned document, the second field data indicating one or more entries in one or more fields of at least the scanned document, the one or more fields corresponding to the author and a second field type.

10. The method of claim 1, further comprising:
    receiving document data from a scanner via an input/output (I/O) interface at the first device, the document data corresponding to the scanned document;
    processing a portion the document data to identify a document type corresponding to the scanned document; and
    storing the first entry in the database, the first entry including an identifier associated with the scanned document and the document type.

11. The method of claim 10, further comprising:
    accessing a document template database based on the document type to identify a first template that corresponds to the document type; and
    extracting entry data from regions within the scanned document corresponding to locations of one or more fields in the first template.

12. The method of claim 1, wherein the indicator is an author indicator, and wherein the author indicator is updated based on the author.

13. A server comprising:
a network interface configured to receive identification data from a second device responsive to transmission of first data to the second device, the first data associated with an author field of a scanned document, the identification data indicating an author corresponding to the author field;
a processor; and
a memory coupled to the processor, the memory storing instructions that, when executed by the processor, cause the processor to:
update an indicator associated with a first entry in a database, the first entry corresponding to the scanned document; and
initiate transmission of a first data chunk to a third device via the network interface, the first data chunk including a candidate set associated with the author and a first field type of a first field of the scanned document, wherein the third device is selected from a plurality of devices based on the first field type.

14. The server of claim 13, further comprising an input/output (I/O) interface configured to receive document data corresponding to the scanned document from a scanner, wherein the instructions, when executed by the processor, further cause the processor to store the first entry in the database, the first entry indicating an identifier associated with the scanned document and a document type corresponding to the scanned document.

15. The server of claim 13, wherein the network interface is further configured to receive, responsive to transmission of the first data chunk, evaluation data from the third device, the evaluation data indicating one or more evaluated entries associated with the one or more fields.

16. The server of claim 13, wherein the instructions, when executed by the processor, further cause the processor to access a profile database based on the author to retrieve the candidate set, and wherein the candidate set includes data indicative of one or more handwritten responses associated with the first field and with the author.

17. A device comprising:
a network interface configured to receive a data chunk from a first device, the data chunk including a candidate set associated with a field of a scanned document and an author of the scanned document;
an input/output (I/O) interface configured to receive input data in response to display of a graphical user interface (GUI) based on the candidate set;
a processor; and
a memory coupled to the processor, the memory storing instructions that, when executed by the processor, cause the processor to:
initiate display of the GUI in response to receiving the data chunk via the network interface, wherein the GUI includes an adjustable likelihood score;
generate evaluation data based on the input data, the evaluation data indicating selection of an entry included in the candidate set; and
initiate transmission of the evaluation data to the first device via the network interface.

18. The device of claim 17, wherein the GUI includes the candidate set and a selectable indicator, and wherein the candidate set includes one or more handwritten entries associated with the field of the scanned document and the author.

19. The device of claim 18, wherein the selectable indicator enables selection of one of one or more handwritten entries or a configurable entry.

20. The device of claim 18, wherein the adjustable likelihood score indicates a likelihood that the entry for evaluation is associated with the author.

21. A method comprising:
receiving, at a first device from a second device via a network interface, identification data responsive to transmission of first data from the first device to the second device, the first data associated with an author field of a scanned document, the identification data indicating an author corresponding to the author field;
updating an indicator associated with a first entry in a database, the first entry corresponding to the scanned document;
transmitting a first data chunk from the first device to a third device via the network interface, the first data chunk including a candidate set associated with the author and a first field type of a first field of the scanned document; and
initiating display of a graphical user interface (GUI) based on evaluation data, wherein the GUI enables a time-varying overview of a construction project.

22. A server comprising:
a network interface configured to receive identification data from a second device responsive to transmission of first data to the second device, the first data associated with an author field of a scanned document, the identification data indicating an author corresponding to the author field;
a processor; and
a memory coupled to the processor, the memory storing instructions that, when executed by the processor, cause the processor to:
update an indicator associated with a first entry in a database, the first entry corresponding to the scanned document;
initiate transmission of a first data chunk to a third device via the network interface, the first data chunk including a candidate set associated with the author and a first field type of a first field of the scanned document; and
initiate display of a graphical user interface (GUI) based on evaluation data, wherein the GUI enables a time-varying overview of a construction project.

* * * * *